US010708101B2

(12) United States Patent
Atungsiri et al.

(10) Patent No.: US 10,708,101 B2
(45) Date of Patent: Jul. 7, 2020

(54) TRANSMITTER AND METHOD OF TRANSMITTING PAYLOAD DATA, RECEIVER AND METHOD OF RECEIVING PAYLOAD DATA IN AN OFDM SYSTEM

(71) Applicant: SATURN LICENSING LLC, New York, NY (US)

(72) Inventors: Samuel Asangbeng Atungsiri, Basingstoke (GB); Jan Zoellner, Braunschweig (DE)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/657,246

(22) Filed: Jul. 24, 2017

(65) Prior Publication Data

US 2017/0324600 A1 Nov. 9, 2017

Related U.S. Application Data

(63) Continuation of application No. 14/778,909, filed as application No. PCT/GB2014/050954 on Mar. 26, 2014, now Pat. No. 9,742,607.

(30) Foreign Application Priority Data

Mar. 28, 2013 (GB) .................................. 1305795.5

(51) Int. Cl.
H04L 27/26 (2006.01)
(52) U.S. Cl.
CPC ...... *H04L 27/2613* (2013.01); *H04L 27/2607* (2013.01); *H04L 27/2627* (2013.01); *H04L 27/2655* (2013.01); *H04L 27/2678* (2013.01)
(58) Field of Classification Search
CPC ............. H04L 27/2613; H04L 27/2655; H04L 27/2627; H04L 27/2678; H04L 27/2607
(Continued)

(56) References Cited

U.S. PATENT DOCUMENTS 9,337,977 B2 5/2016 Gutierrez et al.
2009/0003308 A1 1/2009 Baxley et al.
(Continued)

FOREIGN PATENT DOCUMENTS

CN 101815049 A 8/2010
CN 101958870 A 1/2011
(Continued)

OTHER PUBLICATIONS

Combined Office Action and Search Report dated Aug. 2, 2017 in Chinese Patent Application No. 201480018074.6 (with English translation of categories of cited documents).
(Continued)

Primary Examiner — Fitwi Y Hailegiorgis
(74) Attorney, Agent, or Firm — Oblon, McClelland, Maier & Neustadt, L.L.P.

(57) ABSTRACT

A transmitter transmits payload data using Orthogonal Frequency Division Multiplexed (OFDM) symbols. The transmitter comprises a frame builder configured to receive the payload data to be transmitted and to receive first signalling data for use in detecting and recovering the payload data at a receiver, and to form the payload data and the first signalling data into frames for transmission, the first signalling data forming a part of the frames with the payload data. A modulator is configured to modulate a first OFDM symbol with the first signalling data and to modulate one or more second OFDM symbols with the payload data. A signature sequence processor provides a signature sequence, a combiner combines the signature sequence with the first OFDM symbol, and a transmission unit transmits the first and second OFDM symbols. The signature sequence provided by the signature sequence processor comprises at least one of a first synchronisation sequence or a second message sequence, the first synchronisation sequence and or the
(Continued)

second message sequence being combined by the combiner with the first OFDM symbol. The first synchronisation sequence is provided for a receiver to detect and to recover the first signalling data from the first OFDM symbol and the second message sequence provides message information to the receiver. The message information may be used to convey a specific message to a user such as an emergency warning relating to a natural disaster such as an earthquake or a tsunami warning.

12 Claims, 19 Drawing Sheets

(58) Field of Classification Search
USPC .......................................... 375/300, 260, 295
See application file for complete search history.

(56) References Cited

U.S. PATENT DOCUMENTS

| | | | |
|---|---|---|---|
| 2009/0110092 A1* | 4/2009 | Taylor | H04L 5/0044 375/260 |
| 2010/0158047 A1 | 6/2010 | Lee et al. | |
| 2010/0195668 A1 | 8/2010 | Robert et al. | |
| 2010/0296429 A1* | 11/2010 | Han | H04L 12/189 370/312 |
| 2011/0013732 A1 | 1/2011 | Atungsiri | |
| 2014/0294124 A1 | 10/2014 | Atungsiri et al. | |
| 2015/0078477 A1* | 3/2015 | Hong | H04L 27/2602 375/295 |
| 2015/0256375 A1 | 9/2015 | Asjadi | |

FOREIGN PATENT DOCUMENTS

| | | |
|---|---|---|
| EP | 2 276 213 | 1/2011 |
| KR | 10-2010-0073515 A | 7/2010 |
| KR | 10-2011-0133439 A | 12/2011 |

OTHER PUBLICATIONS

International Search Report dated Jul. 3, 2014 in PCT/GB2014/050954 filed Mar. 26, 2014.
Great Britain Search Report dated Sep. 26, 2013 in GB1305795.5 filed Mar. 28, 2013.
Lim, et al. ,"Novel Frame Synchronization of OFDM Scheme for High-Speed Power Line Communication Systems", IEEE International Symposium on Power Line Communications and its applications, pp. 182-186, 2008.
Korean Office Action dated Jul. 19, 2016 in patent application No. 10-2015-7026579 with English translation.

* cited by examiner

Generation of Gold codes for signature sequence

AWGN performance of preamble protection codes

Preamble Tg should be at least max Tg for all FFT

Alternative coarse frequency offset synchroniser

Differential Encoder

Signature matched filter for frame synchronisation

Pilot correlation implementation to determine (coarse) frequency offset

Multipath (2 paths) channel mode

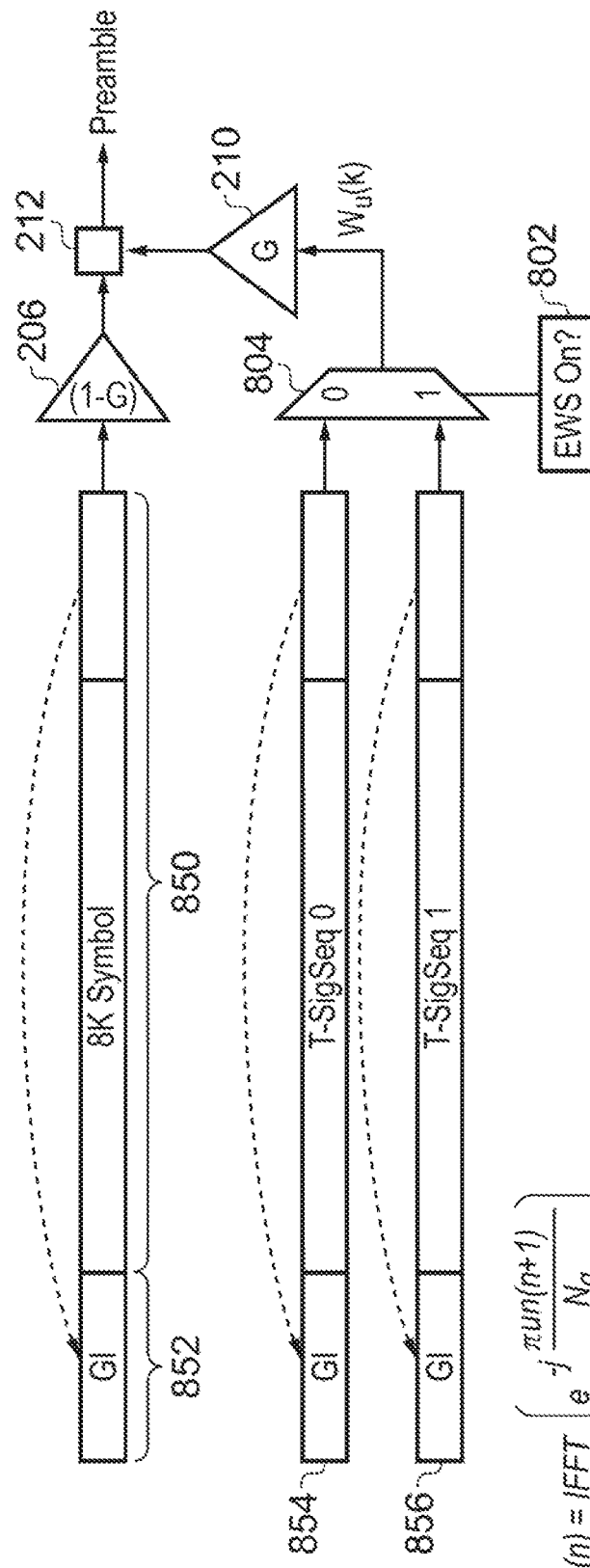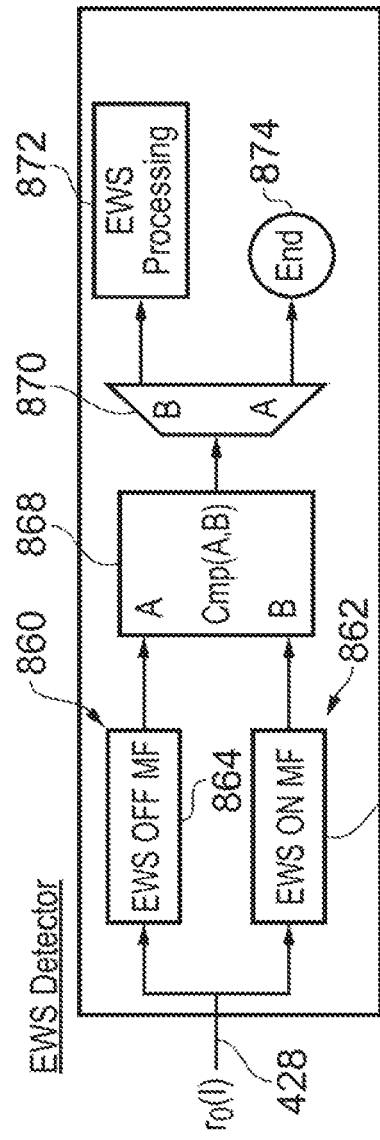
FIG. 22
FIG. 24

TRANSMITTER AND METHOD OF TRANSMITTING PAYLOAD DATA, RECEIVER AND METHOD OF RECEIVING PAYLOAD DATA IN AN OFDM SYSTEM

CROSS REFERENCE TO RELATED APPLICATIONS

The present application is a continuation application which claims the benefit of priority under 35 U.S.C. § 120 of U.S. patent application Ser. No. 14/778,909, filed Sep. 21, 2015, which is a National Stage Application based on PCT/GB2014/050954, filed Mar. 26, 2014, and claims priority to Great Britain patent application no. 1305795.5, filed Mar. 28, 2013; the entire contents of each of which are incorporated herein by reference.

FIELD OF THE DISCLOSURE

The present disclosure relates to transmitters and methods of transmitting payload data using Orthogonal Frequency Division Multiplexed (OFDM) symbols.

BACKGROUND OF THE DISCLOSURE

There are many examples of radio communications systems in which data is communicated using Orthogonal Frequency Division Multiplexing (OFDM). Television systems which have been arranged to operate in accordance with Digital Video Broadcasting (DVB) standards for example, use OFDM for terrestrial and cable transmissions. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation.

As indicated above, the number of narrowband carriers K in an OFDM symbol can be varied depending on operational requirements of a communications system. The guard interval represents overhead and so is preferably minimized as a fraction of the OFDM symbol duration in order to increase spectral efficiency. For a given guard interval fraction, the ability to cope with increased multipath propagation whilst maintaining a given spectral efficiency can be improved by increasing the number K of sub-carriers thereby increasing the duration of the OFDM symbol. However, there can also be a reduction in robustness in the sense that it may be more difficult for a receiver to recover data transmitted using a high number of sub-carriers compared to a smaller number of sub-carriers, because for a fixed transmission bandwidth, increasing the number of sub-carriers K also means reducing the bandwidth of each sub-carrier. A reduction in the separation between sub-carriers can make demodulation of the data from the sub-carriers more difficult for example in the presence of Doppler frequency. That is to say that although a larger number of sub-carriers (high order operating mode) can provide a greater spectral efficiency, for some propagation conditions, a target bit error rate of communicated data may require a higher signal to noise ratio to achieve than required for a lower number of sub-carriers.

SUMMARY OF DISCLOSURE

According to an example embodiment there is provided a transmitter for transmitting payload data using Orthogonal Frequency Division Multiplexed (OFDM) symbols. The transmitter comprises a frame builder configured to receive the payload data to be transmitted and to receive first signalling data for use in detecting and recovering the payload data at a receiver, and to form the payload data and the first signalling data into frames for transmission, the first signalling data forming a part of the frames with the payload data. A modulator is configured to modulate a first OFDM symbol with the first signalling data and to modulate one or more second OFDM symbols with the payload data. A signature sequence processor provides a signature sequence, a combiner combines the signature sequence with the first OFDM symbol, and a transmission unit transmits the first and second OFDM symbols. The signature sequence provided by the signature sequence processor is selected from one of a set of signature sequences, the signature sequence being combined by the combiner with the first OFDM symbol, so that a receiver can detect and recover the first signalling data from the first OFDM symbol. The signature sequences of the set provide message information to the receiver. The synchronisation sequence is provided for a receiver to detect and to recover the first signalling data from the first OFDM symbol before the one or more second OFDM symbols. The choice of one of the at least two possible sequences can form a second signalling data which the transmitter can use to convey a particular message to the receiver. If the number of possible sequences that the transmitter can use is N, then the number of possible messages that can be conveyed through this second signalling data is $\log_2(N)$.

The message information conveyed by this second signalling data may also be used to detect and recover the payload. In other examples the second signalling, data may be used to convey a specific message to a user such as an emergency warning relating to a natural disaster such as an earthquake or a tsunami warning.

Embodiments of the present disclosure can provide a transmitter, which is arranged to transmit payload data using Orthogonal Frequency Division Multiplexing (OFDM) symbols. The transmitter comprises a frame builder which is adapted to receive the payload data to be transmitted and to receive first signalling data for use in detecting and recovering the payload data to be transmitted at a receiver. The frame builder is configured to form the payload data and the signalling data into frames for transmission. The first signalling data may be formed into each frame and transmitted using a first OFDM symbol and the payload data may be transmitted using one or more second OFDM symbols in accordance with transmission parameters, such as a coding rate, a modulation scheme and an operating mode for the number of subcarriers for OFDM symbols. The first OFDM symbol may therefore be different from the second OFDM symbols. The first OFDM symbols may be configured to form a preamble in each frame and may be configured to be detected first by a receiver in order to recover the first signalling data.

Embodiments of the present disclosure can provide an arrangement in which a signature sequence is combined with OFDM symbols carrying, for example, signalling data so that there is an improved likelihood of a receiver being able to detect the OFDM symbols carrying the signalling data. According to an arrangement in which embodiments of the present disclosure find application there is a requirement to provide a "preamble" OFDM symbol in a transmission frame, which carries signalling parameters to indicate, for example, at least some of the communications parameters which were used to encode and to modulate payload data onto the data hearing OFDM symbols whereby after detecting the signalling data within the first (preamble) OFDM symbol the receiver can recover the transmission parameters in order to detect the payload data from the data bearing OFDM symbols. Furthermore, the signature sequence processor is configured to generate either a first synchronisation sequence or a second synchronisation sequence, the selection of the second synchronisation sequence representing information such as the presence of an emergency warning message of within the first signalling data or within the payload.

In some embodiments, the signature sequence may be designed to be detected first, with the detection of the preamble OFDM symbol in a frame, at lower signal to noise ratios than the payload data. As such, the message sequence can provide an early warning or public broadcast information, which is more widely detectable than the payload data. Furthermore, because the message sequence can be detected before the detection of the payload data, a receiver can be configured to detect the message sequence even in a standby state or powered-off state by providing power to only a part of a receiver, which is configured to detect the message sequence.

Various further aspects and features of the disclosure are defined in the appended claims.

BRIEF DESCRIPTION OF THE DRAWINGS

Embodiments of the present disclosure will now be described by way of example only with reference to the accompanying drawings wherein like parts are provided with corresponding reference numerals and in which:

FIG. 17 is a schematic block diagram illustrating a circuit for detecting a coarse frequency offset in the receiver of FIG. 11a;

FIG. 21a is a schematic block diagram of parts of the transmitter of FIG. 6 providing a further example embodiment of the present technique; and FIG. 21b is a table showing example parameters of operation of the transmitter shown in FIG. 21a;

FIG. 22 is a schematic block diagram and part operational diagram schematically illustrating a formation of the preamble OFDM symbol by the transmitter of FIG. 21a;

FIG. 23 is a schematic block diagram of a receiver for detecting a signature sequence of a received signal, which has been transmitted by the transmitter of FIG. 21a;

FIG. 24 is a schematic block diagram of an early warning signal detector according to an embodiment of the present technique.

DESCRIPTION OF EXAMPLE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 1:
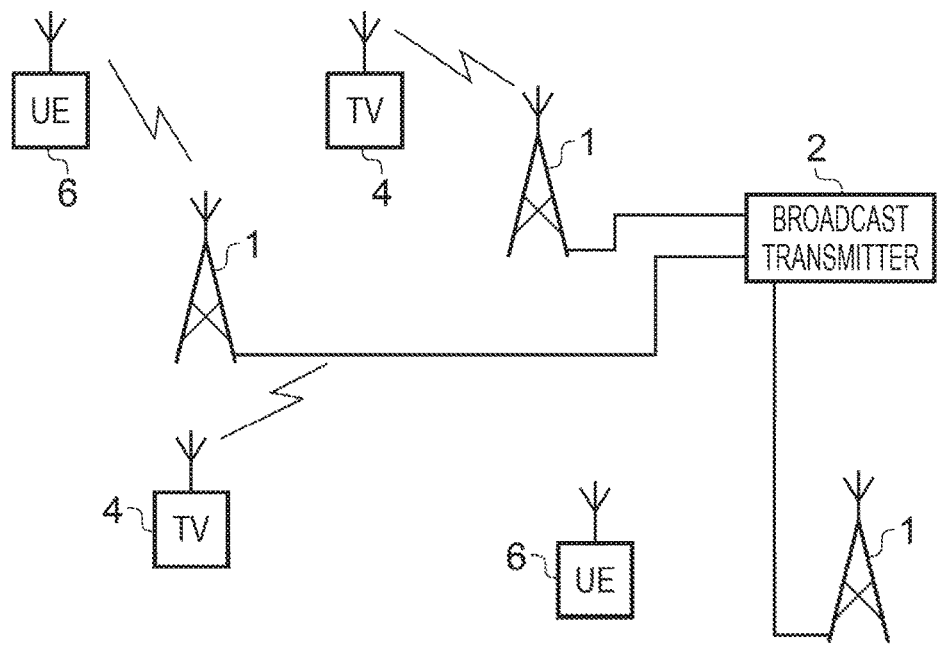
FIG. 1 is a schematic diagram illustrating an arrangement of a broadcast transmission network.

An example illustration of a television broadcast system is shown in FIG. 1. In FIG. 1 broadcast television base stations 1 are shown to be connected to a broadcast transmitter 2. The broadcast transmitter 2 transmits signals from base stations 1 within a coverage area provided by the broadcast network. The television broadcast network shown in FIG. 1 operates as a so called single frequency network in which each of the television broadcast base stations 1 transmit the radio signals conveying audio/video data contemporaneously so that these can be received by television receivers 4 as well as mobile devices 6 within a coverage area provided by the broadcast network. For the example shown in FIG. 1 the signals transmitted by the broadcast base stations 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast base stations 1 is such that the propagation time between the signals transmitted by different broadcast base stations 1 is less than or does not substantially exceed a guard interval that precedes the transmission of each of the OFDM symbols then a receiver device 4, 6 can receive the OFDM symbols and recover data from the OFDM symbols in a way which combines the signals transmitted from the different broadcast base stations 1. Examples of standards for broadcast networks that employ OFDM in this way include DVB-T, DVB-T2 and ISDB-T.

Figure 2:
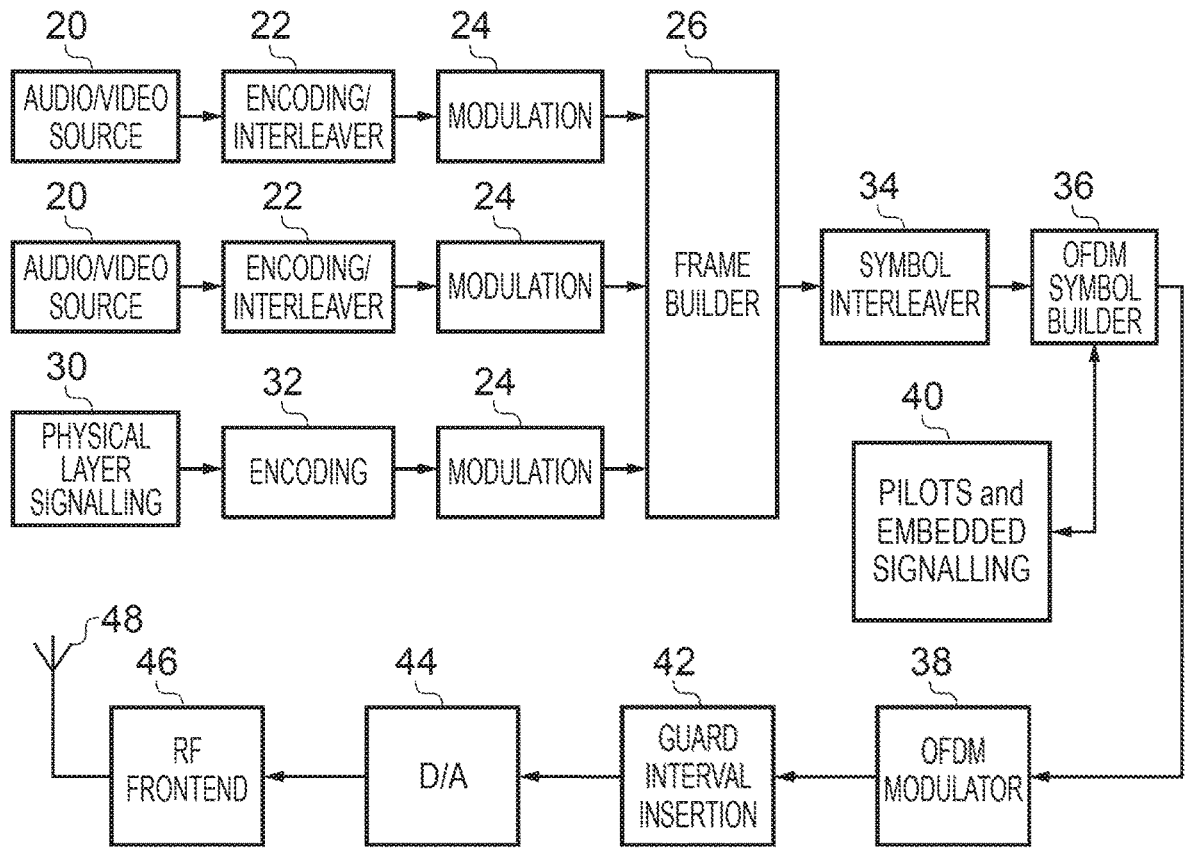
FIG. 2 is a schematic block diagram illustrating an example transmission chain for transmitting broadcast data via the transmission network of FIG. 1.

An example block diagram of a transmitter forming part of the television broadcast base stations 1 for transmitting data from audio/video sources is shown in FIG. 2. In FIG. 2 audio/video sources 20 generate the audio/video data representing television programmes. The audio/video data is encoded using forward error correction encoding by an encoding/interleaver block 22 which generates forward error correction encoded data which is then fed to a modulation unit 24 which maps the encoded data onto modulation symbols which are used to modulate OFDM symbols. Depicted on a separate lower arm, signalling data providing physical layer signalling for indicating for example the format of coding and modulation of the audio/video data is generated by a physical layer signalling unit 30 and after being encoded by an encoding unit 32, the physical layer signalling data is then modulated by a modulation unit 24 as with the audio/video data.

A frame builder 26 is arranged to form the data to be transmitted with the physical layer data into a frame for transmission. The frame includes a time divided section having a preamble in which the physical layer signalling is transmitted and one or more data transmission sections which transmit the audio/video data generated by the audio/video sources 20. A symbol interleaver 34 may interleave the data which is formed into symbols for transmission before being modulated by an OFDM symbol builder 36 and an OFDM modulator 38. The OFDM symbol builder 36 receives pilot signals which are generated by a pilot and embedded data generator 40 and fed to the OFDM symbol builder 36 for transmission. An output of the OFDM modulator 38 is passed to a guard insertion unit 42 which inserts a guard interval and the resulting signal is fed to a digital to analogue convertor 44 and then to an RF front end 46 before being transmitted by an antenna 48.

Figure 3:
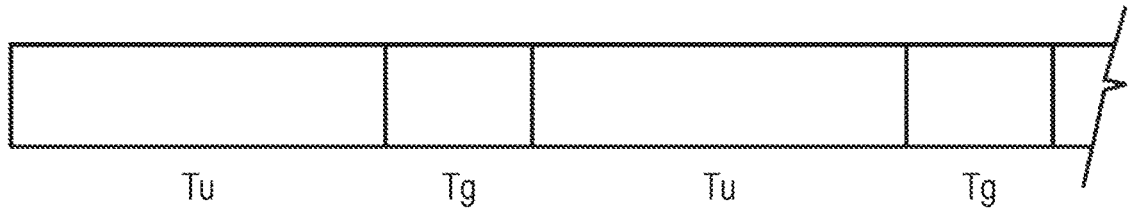
FIG. 3 is a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform. Thus the data to be transmitted is formed in the frequency domain and transmitted in the time domain. As shown in FIG. 3 each time domain symbol is generated with a useful part of duration Tu seconds and a guard interval of duration Tg seconds. The guard interval is generated by copying a part of the useful part of the symbol in the time domain. By correlating the useful part of the time domain symbol with the guard interval, a receiver can be arranged to detect the useful part of the OFDM symbol of duration Tu, from which data can then be recovered by triggering a Fast Fourier Transform to convert the time domain symbol samples into the frequency domain. Such a receiver is shown in FIG. 4.

Figure 4:
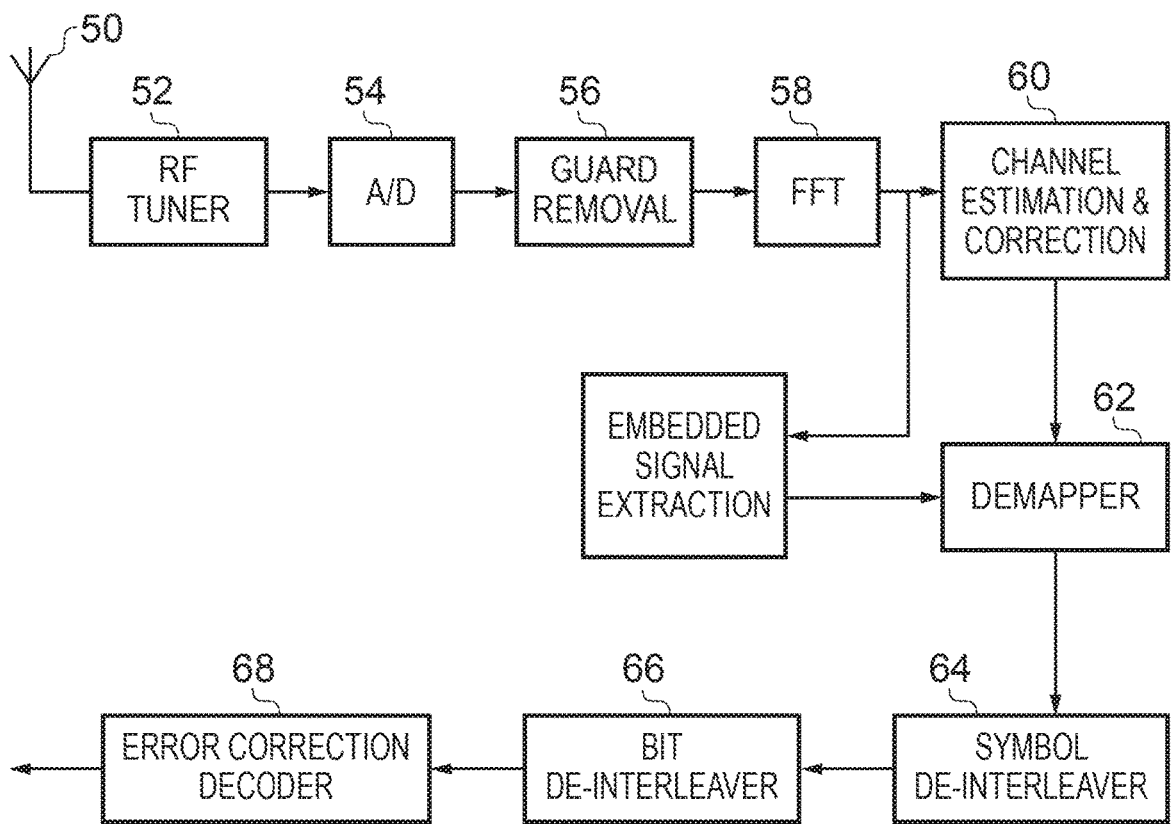
FIG. 4 is a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 then estimates the transmission channel for example by using pilot sub-carriers which have been embedded into the OFDM symbols. After excluding the pilot sub-carriers, all the data-bearing, sub-carriers are fed to a symbol de-interleaver 64 which de-interleaves the sub-carrier symbols. A de-mapper unit 62 then extracts the data bits from the sub-carriers of the OFDM symbol. The data bits are fed to a bit de-interleaver 66, which performs the de-interleaving so that the error correction decoder can correct errors in accordance with a conventional operation.

Framing Structure

Figure 5:
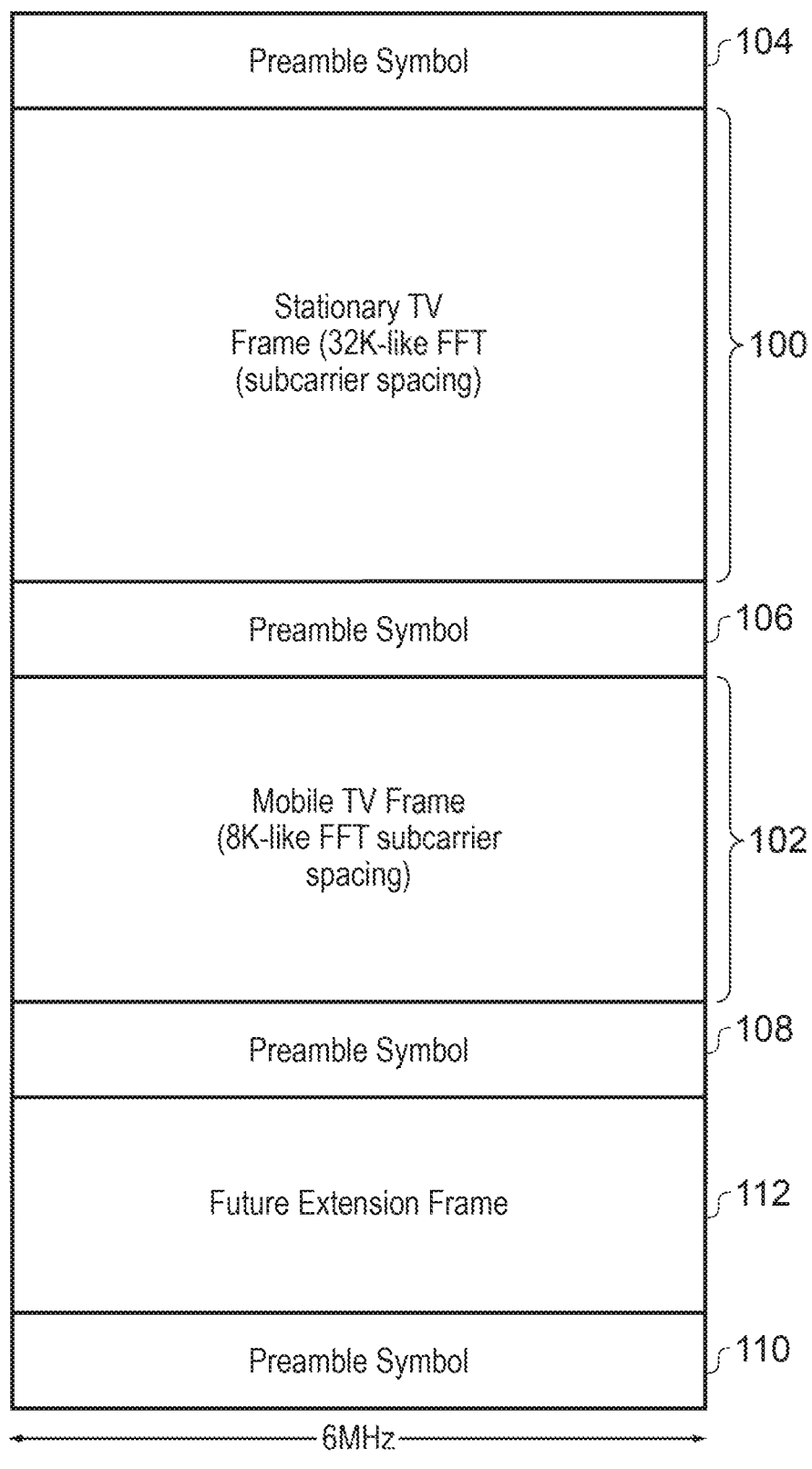
FIG. 5 is a schematic illustration of a transmission frame for transmitting broadcast data including payload data and signalling data.

FIG. 5 shows a schematic of the framing structure according to an example embodiment of the present technique. FIG. 5 illustrates different physical layer frames, some targeted for mobile reception whilst others are targeted for fixed roof-top antenna reception. The system can be expanded in future to incorporate new types of frames, for the current system, these potential new types of frames are simply known as future extension frames (FEFs).

One requirement for fixed reception frames is an improved spectral efficiency which may be assured by such features as adopting a higher order modulation, for example 256 QAM, and higher code rates, for example greater than half rate, because of relatively benign channel conditions, and a high number of sub-carriers per OFDM symbol (FFT size) such as 32K. This reduces the capacity loss due to the guard interval fraction. However, a higher number of sub-carriers can make such OFDM symbols unsuitable for mobile reception because of lower tolerance to high Doppler frequency of the received signal. On the other hand, the main requirement for mobile reception frames could be robustness in order to ensure a high rate of service availability. This can be improved by adopting such features as a low order modulation for example QPSK or BPSK, low code rates, a low number of sub-carriers per OFDM symbol (FFT size) and a high density scattered pilot pattern etc. A low number of sub-carriers for OFDM symbols can be advantageous for mobile reception because a lower number of sub-carriers can provide a wider sub-carrier spacing and so more resilience to high Doppler frequency. Furthermore a high density pilot pattern eases channel estimation in the presence of Doppler.

The framing structure shown in FIG. 5 is therefore characterised by frames which may each include payload data modulated and encoded using different parameters. This may include for example using different OFDM symbol types having, different number of sub-carriers per symbol, which may be modulated using different modulation schemes, because different frames may be provided for different types of receivers. However each frame may include at least one OFDM symbol carrying signalling data, which may have been modulated differently to the one or more OFDM symbols carrying the payload data. Furthermore the signalling OFDM symbol may be a different type to the OFDM symbol(s) carrying the payload data. The signalling data is required to be recovered so that the payload data may be de-modulated and decoded.

What Characteristics for the Preamble?

To delimit frame boundaries, a frame preamble symbol such as the P1 symbol in DVB-T2 is required. The preamble symbol would carry signalling that describes how the following frame is built. It is expected that all of the types of receiver mentioned above whether mobile or with a fixed antenna should be able to detect and decode the preamble in order to determine whether or not they should decode the payload in the following frame. Desirable characteristics for such a preamble include:

1. High Capacity of Signalling; The preamble should have a high signalling capacity—unlike the P1 preamble in DVB-T2 with capacity of 7 signalling bits, a preamble more like in DVB-C2 with 100s of signalling bits is desirable. This suggests that the preamble symbol should be an OFDM symbol with enough sub-carriers to carry all the signalling information.
2. Common Macro-Structure; All frame preambles should have a common pre-defined macro-structure that is understood by all receiver types. This means that the preamble symbol should have for example a constant duration, constant number of sub-carriers and guard interval for all frame types. This forces a constraint that the guard interval must be similar in duration to the longest guard interval that may be used in fixed antenna reception, otherwise when the network uses this longest guard interval, the preamble symbol will suffer from excessive inter-symbol interference (ISI) and perhaps suffer decoding failure.
3. Low Complexity Detection and Decoding: The preamble symbol detection and decoding complexity should be low enough to easily implement in battery powered mobile receivers, so as to make efficient use of limited stored power. This constrains the maximum FFT size and maximum FEC block length.
4. The preamble should be easily detected in the time domain; in DVB-C2, all OFDM symbols within the frame structure use 4K subcarrier spacing. This means that the receiver can start with OFDM symbol time synchronisation followed by frequency domain frame synchronisation (preamble detection). In an embodiment of the present disclosure frames can be arranged such that OFDM symbols in different physical layer frames may have difference subcarrier spacing. Frequency domain frame synchronisation (preamble detection) is thus not readily possible. The preamble symbol must therefore be detected in the time domain. It is only after the preamble is decoded and its signalling payload interpreted that frequency domain processing of the frame can proceed because only then would the receiver have knowledge of the OFDM parameters (number of sub-carriers, guard interval) etc of the data payload bearing OFDM symbols in the body of the frame.
5. Robustness; The preamble should be detectable and decodeable by all receiver types under all channel conditions where such receivers are expected to work. This means that the preamble should be robust to both high levels of noise, low signal to noise ratios and high levels of Doppler shift as experienced during reception on the move. Robustness to high levels of noise constrains the maximum transmission parameters for coding and modulation (MODCOD) that can be used for carrying the signalling payload of the preamble whilst robustness to Doppler constrains the minimum sub-carrier spacing of the preamble OFDM symbol. The preamble OFDM symbol must use a sub-carrier spacing that is large enough to be reasonably resilient to a high Doppler spread. Furthermore, the preamble OFDM symbol should also allow decoding in the presence of frequency shift, common phase error, maximum expected multipath delay spreads etc.

As explained above the preamble OFDM symbol conveys signalling data whilst the OFDM symbols within the body of the transmission frame convey payload data as shown in FIG. 5. Each transmission frame shown in FIG. 5 has particular characteristics. A data bearing frame 100 carries a frame of data, which may use a higher operating mode providing a higher number of sub-carriers per OFDM symbol, for example, approximately 32 thousand sub-carriers (32 k mode) thereby providing a relatively high spectral efficiency, but requiring a relatively high signal to noise ratio to achieve an acceptable data integrity in the form of the bit error rate. The higher order operating mode would therefore be most suitable to communicate to stationary television receivers which have sensitive detection capabilities including well positioned fixed antenna for recovering audio/video data from the 32 k OFDM symbols. In contrast, the frame structure also includes a second frame 102 which is generated to be received by mobile television receivers in a more hostile radio communications environment. The frame 102 may therefore be arranged to form payload hearing OFDM symbols with a lower order modulation scheme such as BPSK or QPSK and a small or lower number of sub-carriers per OFDM symbol (FFT size) such as 4K or 8K to improve the likelihood that a mobile receiver may be able to receive and recover the audio/video data in a relatively hostile environment. In both the first frame 100 and the second frame 102 a preamble symbol 104, 106 is provided which provides signalling parameters for detecting the audio/video data transmitted in the payload part of the transmission frame 100, 102. Similarly, a preamble symbol 108, 110 is provided for a future extension frame 112.

Design of New Preamble Symbol

Some example embodiments can provide an arrangement for forming a preamble symbol for use for example with the transmission frames shown in FIG. 5 in which there is an improved likelihood of detecting the preamble symbol particularly in harsh radio environments. Furthermore, the framing structure shown in FIG. 5 can be devised such that the number of sub-carriers of the payload bearing OFDM symbols is different from frame to frame and furthermore, these sub-carriers may use different modulation schemes. Thus the OFDM symbols which carry the payload data may be of a different type to the OFDM symbols carrying the signalling data. An example block diagram of a part of the transmitter shown in FIG. 2 for transmitting the signalling data is shown in FIG. 6.

Figure 6:
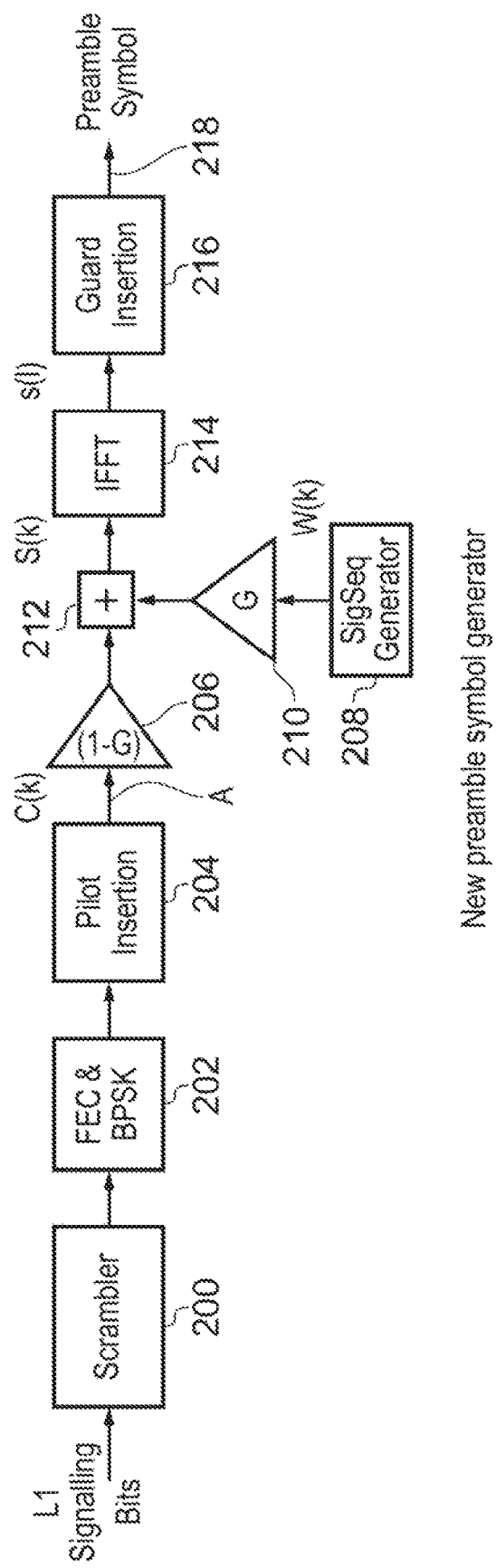
FIG. 6 is a block diagram showing a transmitter for transmitting signalling data via a signalling or preamble OFDM symbol according to one embodiment.

In FIG. 6 the signalling data is first fed to a scrambling unit 200 which scrambles the signalling data which is then fed to a forward error correction (FEC) and modulator unit 202 which encodes the signalling data with a forward error correcting code and then interleaves it before mapping the encoded data onto π/4-BPSK modulation symbols. A pilot insertion unit 204 then inserts pilots in between modulation symbols to form the OFDM symbols of the preamble 104, 106, 108, 110. The OFDM symbol forming the preamble is then scaled by a scaling unit 206 in accordance with a predetermined factor (1−G). The scaling unit 206 adapts the transmission power of the preamble with respect to a signature sequence which is combined with the OFDM symbols of the preamble before transmission so that the total transmission power of the preamble remains the same as it would have been without the signature sequence.

According to the present the technique a signature sequence generator 208 is configured to generate a signature sequence which is fed to a second scaling unit 210 which scales the signature sequence by a predetermined factor G before the scaled signature sequence is combined with the OFDM symbol of the preamble by a combining units 212. Thus the signature sequence W(k) is combined with the OFDM symbol in the frequency domain so that each of the coefficients of the signature sequence is added to one of the subcarrier signals of the OFDM symbol. The combined preamble OFDM symbol and signature sequence are then transformed from the frequency domain to the time domain by an inverse Fourier transform processor (IFFT) 214 before a guard interval insertion unit inserts a time domain guard interval. At an output of the guard insertion unit 216 the preamble symbol is formed on output channel 218.

As can be seen for the example shown in FIG. 6 the signature sequence is combined with the OFDM symbol carrying signalling data in the frequency domain so that a spectrum of the preamble symbol after combining remains within a spectral mask for the transmission channel. As will be appreciated for some examples the signature sequence may be combined with the OFDM symbol in the time domain. However other bandwidth limiting processes must then be introduced after the combination of the signature sequence with the preamble OFDM symbol in the time domain which may affect the correlation properties of the signature sequence at the receiver.

In the example illustration in FIG. 6, the scrambling of the signalling data by the scrambling unit 200 ensures that the peak-to-average power ratio (PAPR) of the preamble symbol will not be excessive due to many similarly modulated OFDM sub-carriers. The scrambled signalling bits are then forward error correction encoded by the FEC and BPSK unit 202 with a 4K LDPC code at a low code rate (¼ or ⅕) prior to mapping to π/4-BPSK which is a low order constellation within the unit 202. The pilots inserted at this stage by the pilot insertion unit 204 are not for channel estimation, but for frequency offset estimation as will be explained shortly. At this stage, a complex preamble signature sequence also composed the same number of complex samples as the useful sub-carriers as the OFDM symbol is added to the samples of the signalling OFDM symbol by the combiner 212. When generated, each preamble signature sequence sample is a point on the unit circle but before addition to the preamble OFDM symbol, each sample is sealed by a predetermined factor G, by a scaler 210 and the corresponding OFDM symbol sample is scaled by (1−G) by a scaler 206 so that the power of the composite preamble symbol should be the same as the power of the signalling OFDM symbol at point A in FIG. 6.

The IFFT 214 then forms the OFDM symbol in the time domain, which is then followed by the insertion of the guard interval by the guard insertion unit 216 which prepends the Ng samples of the preamble OFDM symbol at the start of the preamble OFDM symbol—also known as the as a cyclic prefix of the preamble OFDM symbol. After guard interval insertion, a preamble OFDM time domain symbol of duration Ts=Tu+Tg made up of Ns=Nu+Ng complex samples where Tu is the useful symbol period with Nu samples and Tg is the guard interval duration with Ng samples is formed.

The Signature Sequence Generator

As explained above, the preamble symbol generator of FIG. 6 generates a signature sequence which is combined with the signalling OFDM symbol (first OFDM symbol), which forms the preamble symbol of the frame, in order to allow a receiver to detect the preamble at lower signal to noise ratios compared to signal to noise ratios which are required to detect and recover data from OFDM symbols carrying the payload data. The signature sequence generated by the signature sequence generator 208 can be formed using two pseudo random bit sequence generators one for the in-phase and other for the quadrature phase component. In one example the signature sequences are constant amplitude zero autocorrelation (CAZAC) or Zadoff-Chu sequences. In other examples each signature sequence is formed from a pair of Gold code sequences chosen because of their good auto-correlation properties, or other example signature sequences could be used such as M-sequences.

Figure 7:
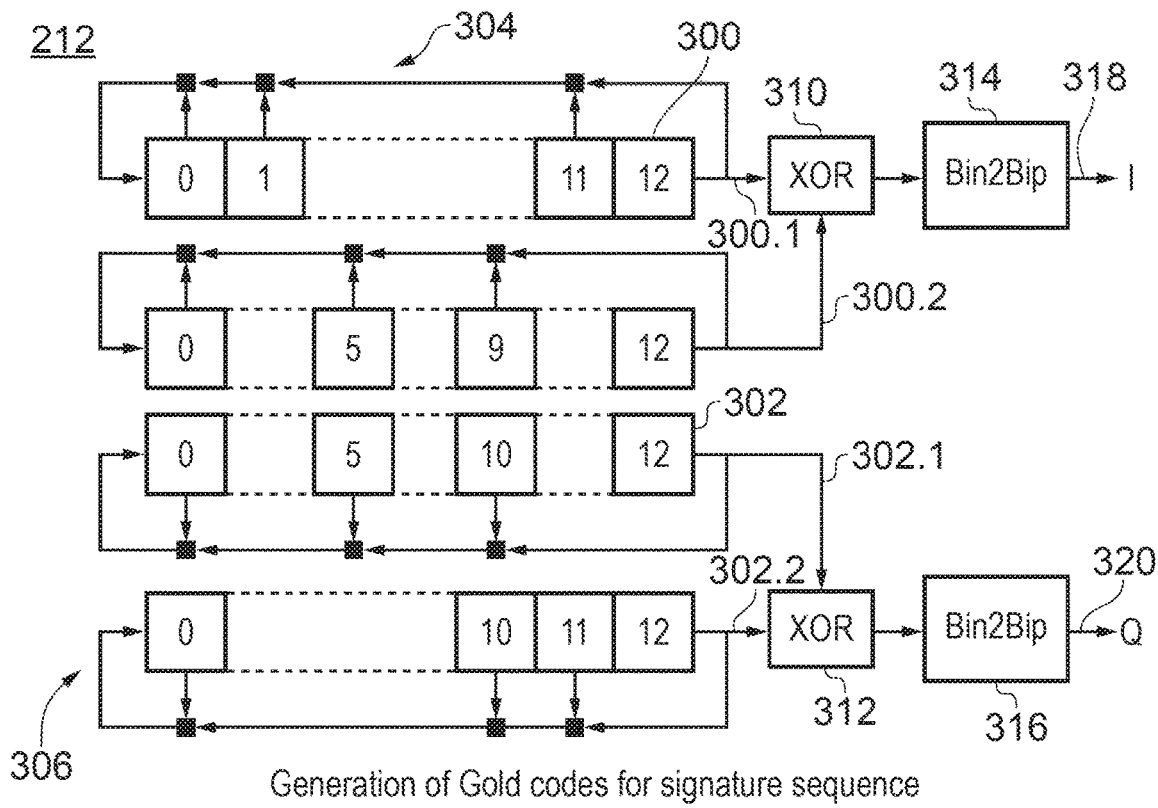
FIG. 7 is a schematic block diagram of a signature sequence generator according to one embodiment.

One example of the signature sequence generator 208 shown in FIG. 6 is shown in more detail in FIG. 7. FIG. 7 is arranged to generate a complex signature sequence which is added to the complex samples of the signalling OFDM symbol by the combiner 212 shown in FIG. 6.

In FIG. 7 two linear feedback shift registers are used in each case to generate a pair of pseudo random bit sequences for the in-phase 300.1 and 300.2 and quadrature 302.1 and 302.2 components. In each case, the pseudo-random bit sequence pair is combined using exclusive-OR circuits 310, 312 to produce the Gold sequences for the in-phase (300.1 and 300.2) and quadrature (302.1 and 302.2) part of the signature sequence, respectively. A binary to bipolar mapper unit 314, 316 then forms respectively a sample for the in-phase 318 and quadrature (imaginary) 320 components of the signature sequence. Effectively, the arrangement shown in FIG. 7 generates Gold codes formed by XORing two m-sequences. The m-sequences are generated by the linear feedback shift registers 300, 302. A table 1 below shows the generator polynomials for the linear feedback shift registers according to the example shown in FIG. 7:

TABLE 1

Generator polynomials for complex signature sequence.

| Sequence Name | Generator polynomial |
| --- | --- |
| R_seq1 | $x^{13} + x^{11} + x + 1$ |
| R_seq2 | $x^{13} + x^9 + x^5 + 1$ |
| I_seq1 | $x^{13} + x^{10} + x^5 + 1$ |
| I_seq2 | $x^{13} + x^{11} + x^{10} + 1$ |

Determining an Optimum Value for the Scaling Factor G

As shown in FIG. 6, the scaler 210 multiplies the signature sequence by a factor G and the scaler 206 multiplies the signalling OFDM symbol by a factor 1−G. As such, if the time domain signalling OFDM symbol signal is c(n) while the signature sequence signal is f(n), then the composite transmitted preamble symbol s(n) is given by:

$$s(n)=(1-G)c(n)+Gf(n)$$

where G is the scaling applied to the signature sequence. The signature signal effectively adds distortion to the signalling OFDM symbol thereby increasing the bit error rate of the signalling OFDM symbol at the receiver. Furthermore, with a normalised power of 1, the composite symbol in effect distributes power between the signature signal and the signalling OFDM symbol signal. With a high value for G, the signature signal has more power and so frame synchronisation (detection of the preamble) at the receiver should be achieved at a lower signal to noise ratio. However, reducing the power of the signalling OFDM symbol (in order to increase the power of the signature signal) also means that error-free decoding of the signalling information itself becomes more difficult at the receiver as the signal-to-noise of the signalling OFDM symbol has fallen. Therefore, an optimum value for G has to be a compromise between these conflicting aims. We can further define P=(1−G)/G which is proportional to the power ratio between the signalling OFDM symbol and the signature signal. An appropriate value for G can be set by experimenting with this power ratio P.

Figure 8:
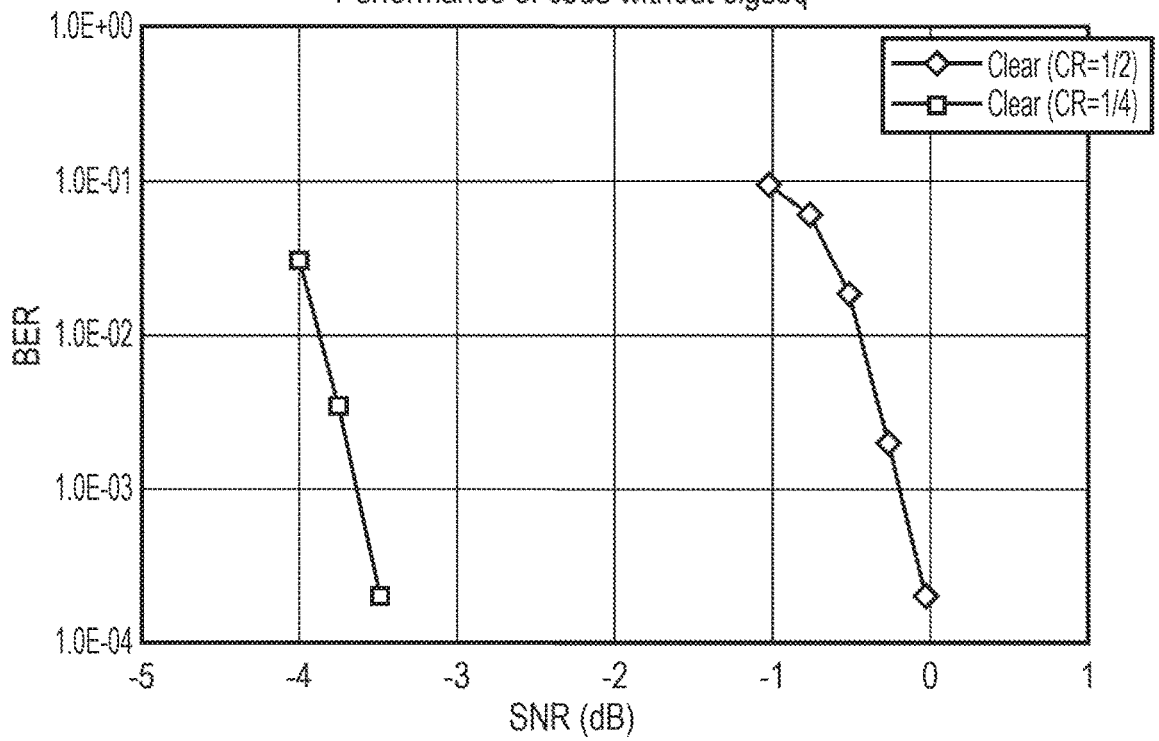
FIG. 8 is a graphical plot of bit error rate with respect to signal to noise ratio in the presence of additive white Gaussian noise for coding rates of one half and one quarter.

The performance of example error correction codes which may be used for protecting the preamble symbol can be assessed in the presence of Additive White Gaussian Noise, using an appropriate constellation for the signalling information. For example a QPSK modulation scheme can be used with example error correction codes. In the present example 4K LDPC half rate and quarter rate codes were evaluated. FIG. 8 provides a graphical illustration of the performance for communicating the signalling data using the signalling OFDM symbol for these half and quarter rate LDPC codes and shows for each code a hit error rate performance with respect to signal to noise ratios for an additive white Gaussian noise channel. It can be seen that at a signal to noise ratio of −3 dB and a signal to noise ratio of 1 dB, the quarter rate and half rate codes respectively each become error free. These values of signal to noise ratios were then increased to −2 dB and 2 dB respectively and then the signature signal added with values of P varied until a bit error rate of zero was achieved.

As will be appreciated the error correction code which may be used to protect the signalling data carried in the preamble symbol may have coding rates which are different to rate one-half and rate one-quarter. In some embodiments the coding rate is less than or equal to one-quarter. In one example the coding rate is one-fifth (⅕).

Figure 9:
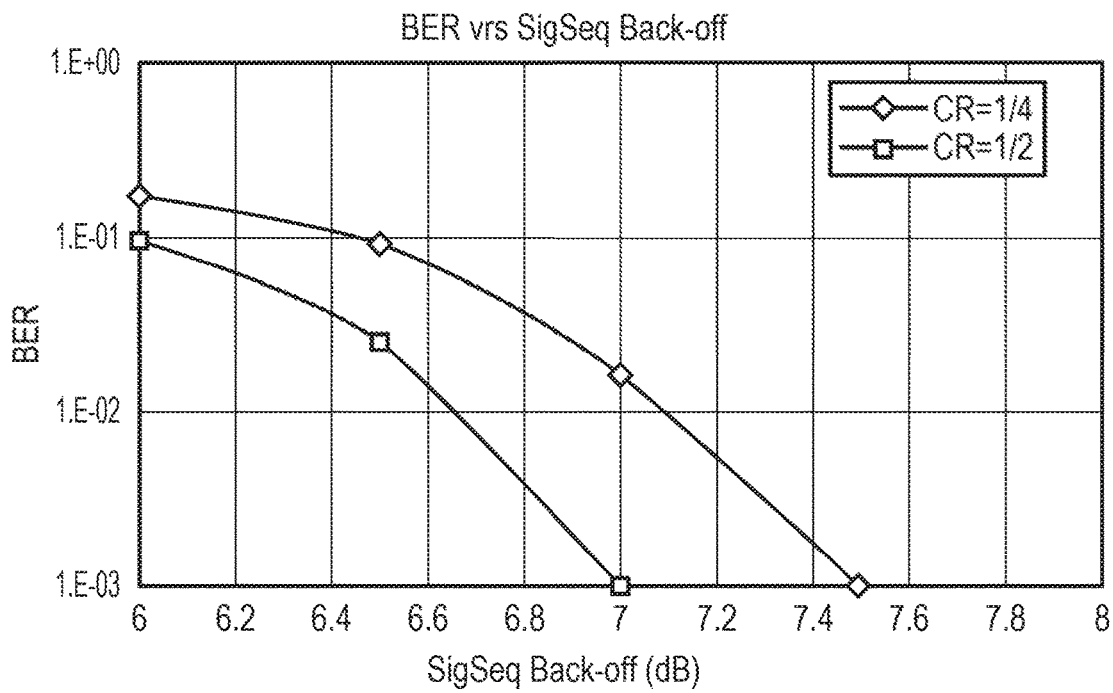
FIG. 9 is a graphical plot of bit error rate with respect to a signature sequence back-off from the power of the modulated signalling data, which provides an acceptable performance according to the results of FIG. 8.

FIG. 9 provides a graphical plot for code rates of one quarter and one half showing a bit error rate for each code rate as the factor P on the x-axis and SNR fixed to −2 dB and 2 dB respectively. As can be seen from these results setting P=8 dB will give a bit error rate close to zero, despite the presence of the signature sequence, which has been added to the signalling OFDM symbol. It can also be seen experimentally, that with this value of the factor P, preamble detection can be achieved. A value of P=8 dB has, therefore, been adopted for the different half and quarter rate code rates with QPSK modulated data subcarriers of the signalling OFDM symbol. As can be seen an optimising choice for the factor P can be chosen from the results produced.

Determining a Suitable Guard Interval Fraction

According to example embodiments of the present technique, the same preamble symbol will delimit physical layer frames meant for both fixed and mobile reception. In the following analysis it is assumed that a broadcast transmission system, which has both types of transmission frames will be used. As such one of the principal factors affecting the reception of payload data bearing OFDM symbols transmitted for fixed reception is spectral efficiency. As explained above, this means the use of large numbers of sub-carriers for the OFDM symbols and correspondingly large FFT sizes because a smaller guard interval fraction (GIF) can be used to get a large guard interval duration (GID). A large GID can allow a broadcast system to have a greater separation between broadcast transmitters and can operate in environments with a greater delay spread. In other words the broadcast transmission system is configured with a wider spacing between transmitters forming a single frequency network (SFN).

Figure 10A:
FIG. 10a is a schematic representation of OFDM symbols with a guard interval matched to an expected delay spread produced for a single frequency transmission network.
Figure 10B:
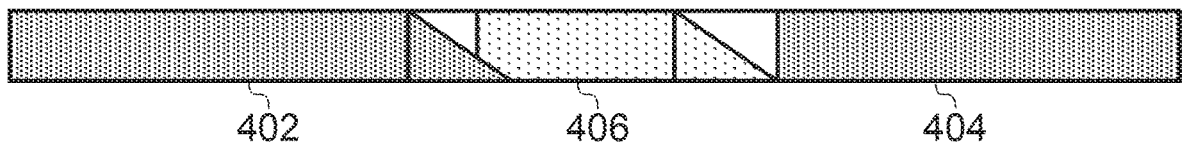
FIG. 10b is a schematic representation of OFDM symbols with different numbers of sub-carriers per OFDM symbol with a guard interval selected as a fixed fraction of the related OFDM symbol duration.
Figure 10C:
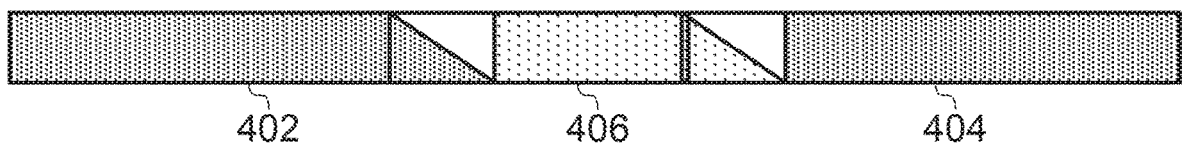
FIG. 10c is a schematic representation of OFDM symbols with a different number of sub-carriers per payload data bearing OFDM symbol and a different number of sub-carriers for a signalling OFDM symbol with guard interval selected to have a duration which is matched to both the payload and the signalling OFDM symbols.

FIG. 10 illustrates how the selection of the guard intervals can be affected when different operating modes providing different numbers of sub-carriers per OFDM symbol (different FFT sizes) are used for different frames in the same transmission. In contrast to the diagram shown in FIG. 5, the diagram shown in FIG. 10 is in the time domain. Three sets of OFDM symbols are shown in the time domain illustrative of what may happen at the point where one frame ends and another starts in a single transmission. In FIG. 10a the duration of the last OFDM symbol 402 of the ending frame is the same as that of the first OFDM symbol 404 of the starting frame. The unshaded area 405 between the two OFDM symbols 402 and 404 represents the guard interval that precedes symbol 404. In FIG. 10b an example of a preamble symbol shown as the light grey area 406 is inserted to delimit the two frames. As can be seen, this example preamble symbol 406 has a shorter duration than the data bearing symbols 402 and 404 as a consequence of having a different number of sub-carriers per OFDM symbol. Accordingly, if the GIF for the preamble symbol is the same as for the data symbols, the guard interval duration for the preamble symbol will not be as long as that of the data bearing symbols. Accordingly, if the delay spread of the channel is as long as the guard interval of the data bearing OFDM symbol 402, then the preamble symbol 406 will suffer inter-symbol interference from the last symbol 402 of the previous frame. Examples shown in FIG. 10c can provide an arrangement in which the guard interval fraction for the preamble symbol is selected to the effect that the guard interval duration of the preamble symbol 406 matches or may be longer than the guard interval duration of the last data bearing symbol 402 of the previous frame.

According to some example embodiments the largest number of sub-carriers per symbol is substantially thirty two thousand (32K). With a 32K FFT size in DVB-T2 for example, the largest GIF is $19/128$. For 6 MHz channel raster, this represents a GID of about 709.33 us. When this GID is used for the frame carrying OFDM symbols targeted for fixed receivers, the preamble OFDM symbol GID should at least be of a similar value, otherwise, the preamble symbol will suffer inter-symbol-interference from the last symbol of a previous fixed reception frame.

In a 6 MHz channel raster system in which for example DVB-T2 is transmitted, an OFDM symbol having substantially four thousand sub-carriers (4K) OFDM symbol has a duration of only 2*224*8/6=597.33 us. Therefore even with a GIF=1, it is not possible to get a GID of 709.33 us with a 4K OFDM symbol. A table below lists possible operating modes that are receivable in medium to high Doppler frequencies (for the mobile environment) and some possible guard intervals.

TABLE 2

Mobile FFT modes and their possible guard intervals

| FPT Size | Tu in 6 MHz (us) | GIF | GID (us) | Ts (us) |
|---|---|---|---|---|
| 4K | 597.33 | 1 | 597.33 | 1194.667 |
|  |  | ¼ | 298.67 | 1493.338 |
| 8K | 1194.67 | ½ | 597.33 | 1792.005 |
|  |  | 19/32 | 709.33 | 1904.000 |
|  |  | ¾ | 896.00 | 2090.638 |

From the above table it can be seen that only an 8K operating mode for the preamble OFDM symbol has GIF<1 which matches or exceeds the maximum GID for a 32K maximum number of sub-carriers of the OFDM symbol. In conclusion therefore, embodiments of the present technique can provide a number of sub-carriers for the signalling or preamble OFDM symbol of 8192 sub-carriers, which corresponds to an 8K FFT size, for which the GIF will be about $19/32$. This means that the total signalling OFDM symbol will have a duration of Ts≈1904 us. Furthermore an 8K operating mode will have a sub-carrier spacing, which provides a mobile receiver with a reasonable chance of detecting and recovering the signalling data from the preamble OFDM symbol in medium to high Doppler frequencies. It can be understood that in embodiments of this disclosure, the GIF of the preamble symbol has to be chosen to have a GID that is the same or longer than the longest GID of the maximum FFT size available in the system.

Channel Estimation Considerations

As known in OFDM transmission systems such as DVB-C2, frequency domain preamble pilots may be inserted into a preamble symbol at regular intervals for use in channel estimation prior to equalisation of the preamble symbol. A density of such pilots Dx, which is the spacing in frequency is dependent on the maximum delay spread that can be expected on the channel. As explained above, with a single frequency transmission network, it can be advantageous to use a larger GID. For such single frequency networks, a channel impulse response can have a duration which is equal to the GID. Thus, the delay spread of the channel for preamble equalisation may be as much as the GID. When using preamble pilots spaced by Dx subcarriers, pilot-aided channel estimation is possible for delay spreads as long as Tu/Dx. This means that Dx must be set such that:

$$T_u/D_x \geq T_g$$

Since for an 8K preamble in a 6 MHz channel, Tu=1194.67 us, $$D_x \leq \left\lceil \frac{T_s}{T_g} \right\rceil$$

Substituting Tu=1194.67 and Tg=709.33, $D_x \leq 2$. This means that more than one in every two sub-carriers of the signalling OFDM symbol would become a pilot sub-carrier. This would have the effect of cutting the capacity of the signalling OFDM symbol by more than half. As such, this conclusion suggests that an alternative technique should be adopted to estimate the channel impulse response rather than using frequency domain pilots.

Frequency Offset Considerations

At first detection, the signalling or preamble OFDM symbol may have to be decoded in the presence of any tuning frequency offsets introduced by tuner 52. This means that either the signalling data should be modulated unto the preamble OFDM symbol in a manner that reduces the effects of any frequency offsets or resources are inserted into the preamble symbol to allow the frequency offset to be estimated and then removed prior to preamble decoding. In one example the transmission frame may only include one preamble OFDM symbol per frame so the first option is difficult to achieve. For the second option, additional resources can be in the form of frequency domain pilot subcarriers, which are inserted into the OFDM so that these can be used to estimate the frequency offset and common phase error. The frequency offsets are then removed before the symbol is equalised and decoded. In a similar vein to the insertion of pilots into the data payload bearing OFDM symbols, embodiments of the present technique can be arranged to provide within the signalling (preamble) OFDM symbol pilot sub-carriers, which can allow for the estimation of frequency offsets that are larger than the preamble sub-carrier spacing. These pilots are not spaced regularly in the frequency dimension to avoid instances when multipath propagation may result in regular nulls of the pilots across the full preamble OFDM symbol. Accordingly, 180 pilot sub-carriers can be provided across the 8K symbol with the positions defined aprori. The sub-FFT bin frequency offset is estimated via the detection of the preamble OFDM symbol itself. Accordingly embodiments of the present technique can provide a preamble OFDM symbol in which the number of sub-carriers carrying pilot symbols is less than the number which would be required to estimate a channel impulse response through which the preamble OFDM symbol is transmitted, but sufficient to estimate a coarse frequency offset of the transmitted OFDM symbol.

Frequency Offset Detection at the Receiver

Figure 11A:
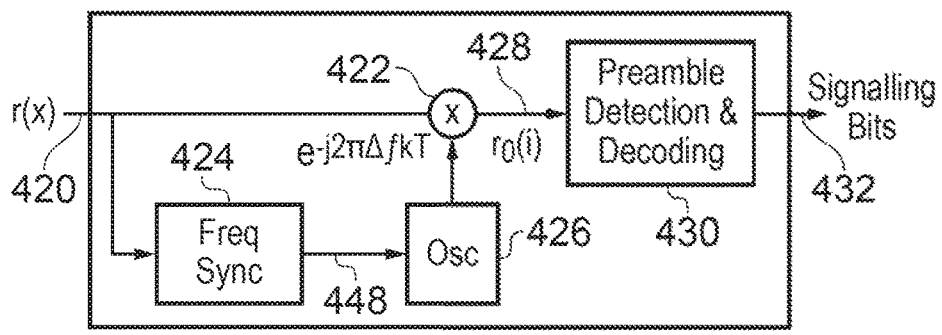
FIG. 11a is a schematic block diagram of a receiver for detecting and recovering signalling data from a signalling OFDM symbol according to the present technique.

As explained above the preamble is formed by combining an OFDM symbol carrying signalling data with a signature sequence. In order to decode the signalling data, the receiver has to first detect and capture preamble OFDM symbol. In one example the signature sequence may be detected using a matched filter which has impulse response which is matched to the conjugate of the complex samples of the known signature sequence. However any frequency offset in the received signal has an effect of modulating the output of the matched filter and preventing accurate detection of the signature sequence using a match filter. An example receiver for detecting the preamble and recovering the signalling information provided by the preamble in the presence of a frequency offset is shown in FIG. 11a. In FIG. 11a, a signal received from an antenna is converted to a baseband signal, using a conventional arrangement as shown in FIG. 4 and fed from an input 420 respectively to a complex number multiplier 422 and a frequency synchroniser 424. The frequency synchroniser 424 serves to detect the frequency offset in the received signal r(x) and feed a measure of the offset in respect of a number of subcarriers to an oscillator 426. The oscillator 426 generates a complex frequency signal which is fed to a second input of the multiplier 422 which serves to introduce a reverse of the offset into the received signal r(x). Thus the multiplier 422 multiplies the received signal r(x) with the output from the oscillator 436 thereby compensating or substantially reversing the frequency offset in the received signal so that a preamble detection and decoding unit 430 can detect the preamble OFDM symbol and recover the signalling data conveyed by the preamble which is output on output channel 432.

Figure 11B:
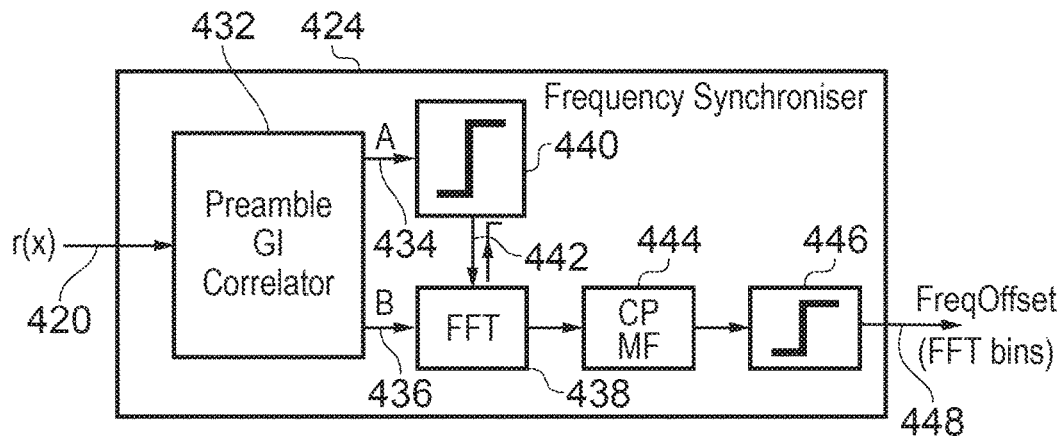
FIG. 11b is a schematic block diagram of a frequency synchronisation detector which forms part of FIG. 11a, FIG. 11c is a schematic block diagram of a preamble guard interval correlator which forms part of FIG. 11b.

FIG. 11b provides an example implementation of the frequency synchroniser 424 which forms part of the receiver shown in FIG. 11a. In FIG. 11b the received signal is fed from the input 420 to a preamble guard interval correlator 432 which generates at a first output 434 a signal providing an indication of the start of the useful part of the OFDM symbol samples Nu. A second output 436 feeds the samples of the OFDM symbol to a Fourier transform processor 438, but delayed by the number of samples in the useful part Nu. The first output 434 from the preamble guard interval correlator 432 detects the location of the guard interval and serves to provide a trigger signal from a threshold detector 440 to the FFT 438 through a channel 442 which triggers the FFT 438 to convert the time domain samples of the useful part of the OFDM symbol Nu into the frequency domain. The output of the Fourier transform processor 438 is fed to a continuous pilot (CP) matched filter unit 444, which correlates the pilot signals in the received OFDM symbol with respect to replicas at the receiver which are used to set an impulse response of the CP matched filter in the frequency domain. The matched filter 444 therefore correlates the regenerated pilots with the received OFDM symbol and feeds a result of the correlation to an input to a detection threshold unit 446. The detection threshold unit 446 detects an offset in the received signal in terms of the number of FFT bins on channel 448 which effectively provides the frequency offset which is fed to the oscillator 426 for correcting the offset in the received signal.

Figure 11C:
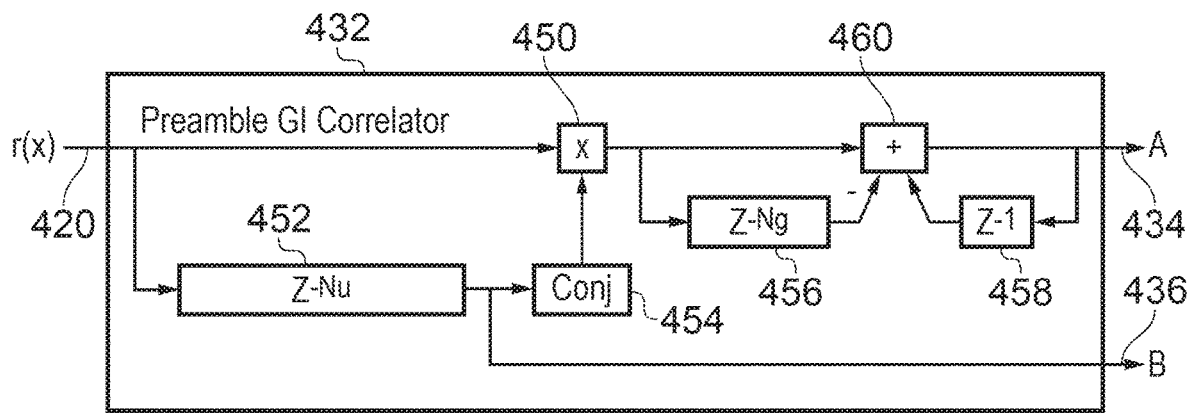
FIG. 11d is an illustrative schematic block diagram of a further example of a coarse frequency offset synchronisation detector which forms part of the receiver of FIG. 11a, and FIG. 11e is an illustrative schematic block diagram of a differential encoder which forms part of FIG. 11d.

FIG. 11c provides an example of implementation of the preamble guard interval correlator 432 and corresponds to a conventional arrangement for detecting the guard interval. Detection is performed by cross correlating the samples of the received OFDM symbol with themselves after a delay of Nu samples with the cross correlation outputs accumulated over consecutive Ng sample intervals. Thus the received signal is fed from an input 420 to a multiplier 450 and a delay unit 452 which feeds an output to a complex conjugator 454 for multiplying by the multiplier 450 with the received signal. A delay unit 456 delays the samples by the number of samples Ng in the guard interval and a single delay unit 458 delays an output of an adder 460. The adder 460 receives from the multiplier 450 the results of multiplying the received signal with a conjugate of the delayed samples corresponding to the useful samples Nu which is then fed to the adder 460. Together adder 460, delay blocks 456 and 458 implement a moving average filter of order Ng whose effect is to accumulate successive output of the cross-correlator over Ng samples. Thus at a point 434 there is provided an indication of the detection of the useful part of the OFDM symbol by detecting the guard interval period. The output 436 provides the delayed received signal samples which are fed to the FFT in order to trigger the Fourier transform after the guard interval has been detected by the first output 434.

Figure 11D:
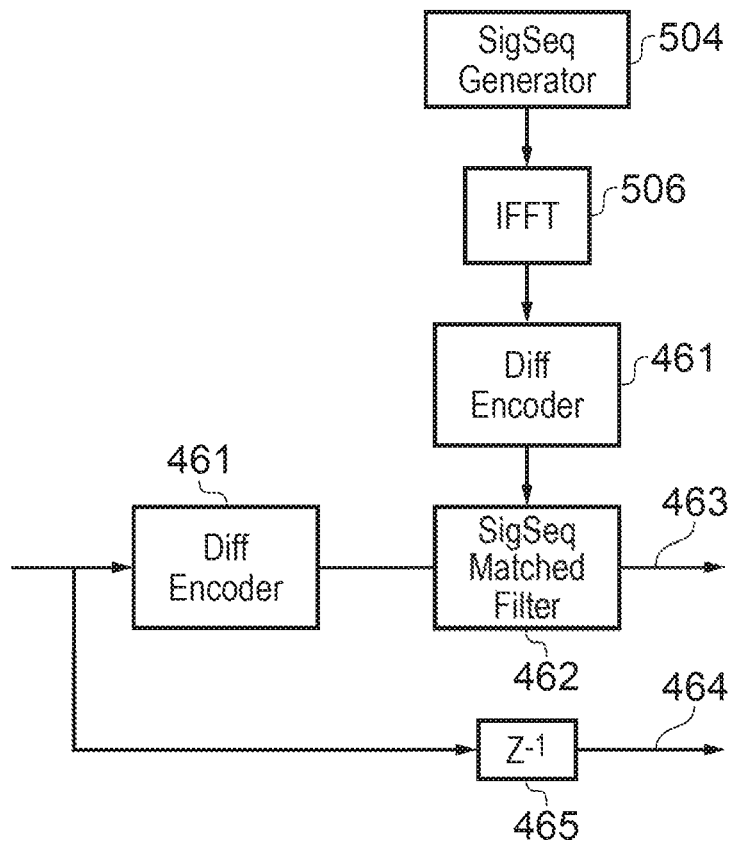
Figure 15A:
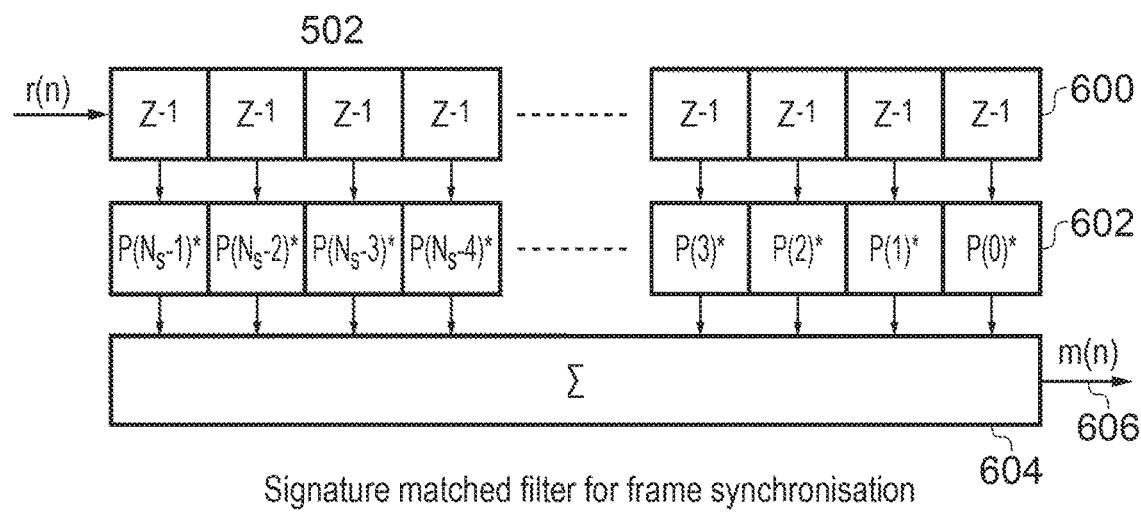
FIG. 15a is a schematic block diagram of a matched filter, which is matched to the signature sequence for which an example generator is shown in FIG. 7.

FIG. 11d provides another example of implementation of the frequency synchroniser 424 and corresponds to a first detection of the preamble symbol by use of a signature sequence matched filter 462. Firstly however, the differential encoder block 461 is used to alter the received signal so as to reduce the modulation of the matched filter output by any frequency offset present in the received signal. The differential encoder 461 is applied both to the received signal and the time domain signature sequence which is generated by inverse Fourier transform 506 of the output of the frequency domain signature sequence generator 504. The signature sequence matched filter 462 to be described later in FIG. 15a is a finite impulse response filter whose taps are set to the coefficients of the time domain signature sequence.

The circuit shown in FIG. 11d therefore forms an example of the frequency synchroniser 424 in which the signature sequence generator 504 re-generates the signature sequence, the inverse Fourier transformer 506 transforms the signature sequence into the time domain, and the differential encoder 461 compares differentially successive samples of the received signal to reduce a modulating effect of the frequency offset in the radio signal, and correspondingly compares differentially successive samples of the time domain version of the signature sequence. As already explained, the matched filter 462 has an impulse response corresponding to the differentially encoded signature sequence and receives the received signal from the differential encoder 461 and filters the differentially encoded received signal to generate at an output an estimate of the coarse frequency offset.

Figure 11E:
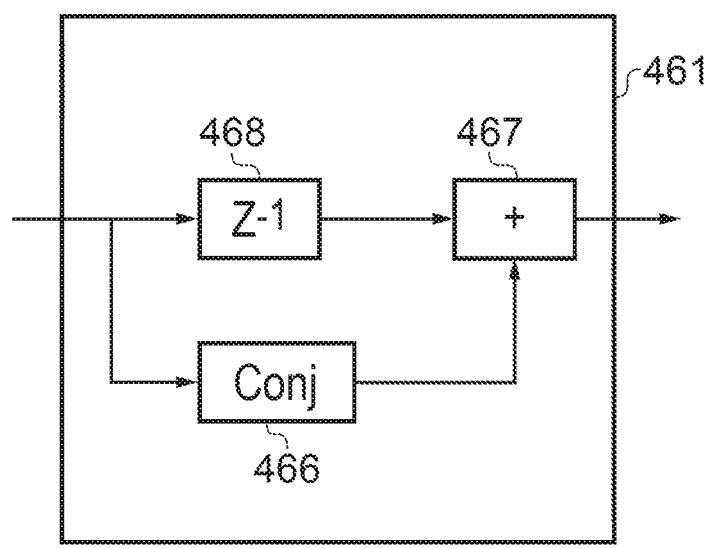

Corresponding to output channel 434 in FIG. 11b, output channel 463 in FIG. 11d produces a signal which is fed to the threshold block 440 to generate a trigger for the FFT 438; whilst output channel 436 in FIG. 11b corresponds to output channel 464 in FIG. 11d. This channel conveys the preamble OFDM symbol samples to the FFT block 438 which at the right moment is triggered by through channel 442 by the threshold block 440. FIG. 11e provides an example of the differential encoding block 461. The received samples r(n) enter a unit delay element 465 and also a conjugation block 466. The delay element 465 delays each sample for one sample period while the conjugation element 466 changes each input sample to its conjugate at its output whose effect is to convert an input $[r_i(n)+jr_q(n)]$ into an output $[r_i(n)-jr_q(n)]$. This conjugated sample is then subtracted from the output of delay element 465 by the adder 467. For an input signal $[r_i(n)+jr_q(n)]$ and output $[y_i(n)+jy_q(n)]$ n=0, 1, 2 ..., the differential encoder 461 acts to implement the equation:

$$[y_i(n)+jy_q(n)]=[r_i(n-1)-r_i(n)]+j[r_q(n-1)+r_q(n)]$$

Accordingly before preamble detection and decoding is performed by the preamble detection decoding unit 430 the frequency offset in the received signal is estimated and corrected by the arrangements shown in FIGS. 11a and 11b and 11c, or 11d and 11e.

Preamble Detection and Decoding at the Receiver

Figure 13:
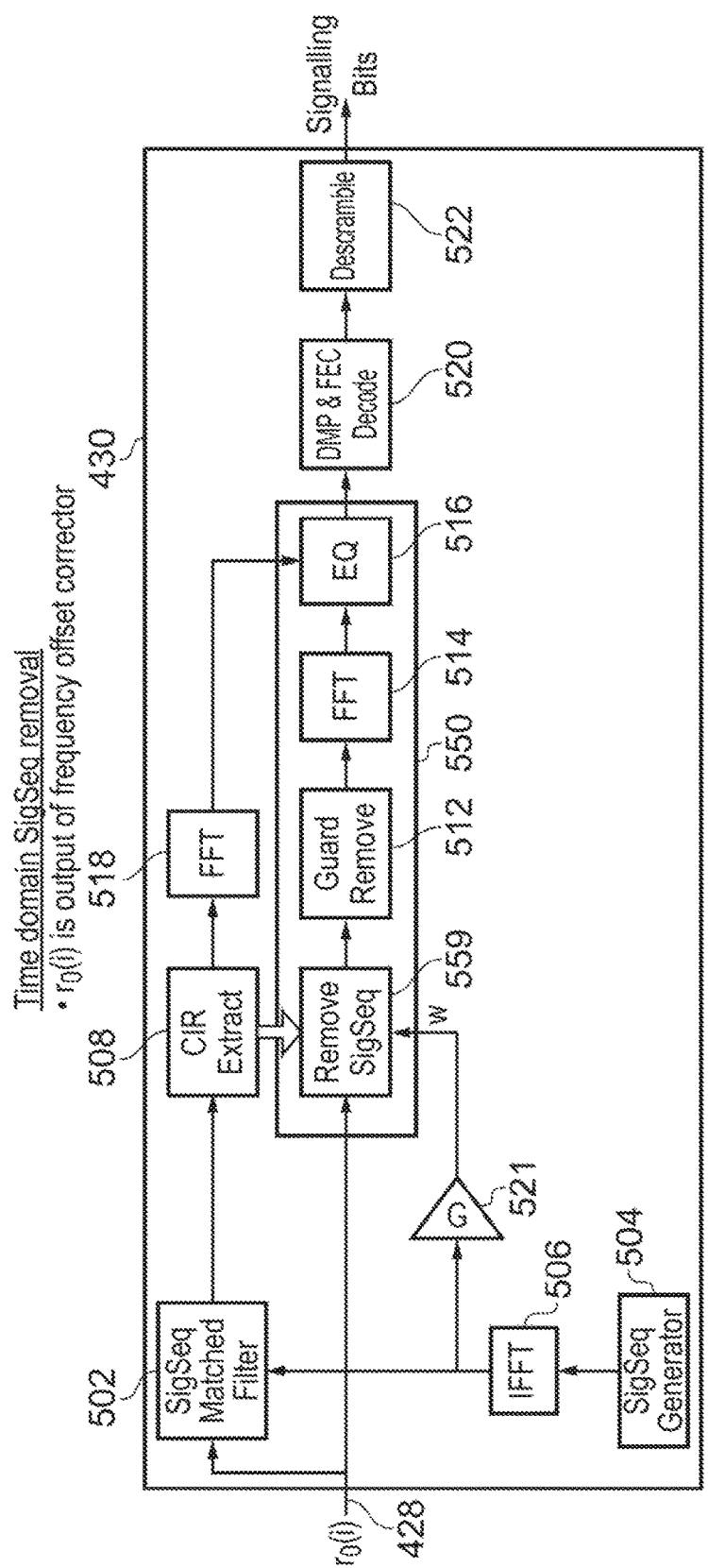
FIG. 13 is a schematic block diagram of one example of a preamble detection and decoding processor which forms part of the receiver shown in FIG. 11a, which detects and removes the signature sequence in the time domain.
Figure 14:
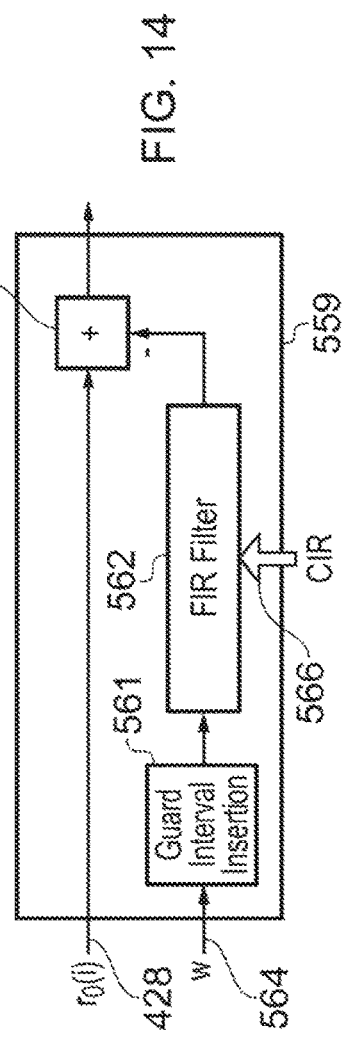
FIG. 14 is a schematic block diagram of an example of a signature sequence remover which forms part of the preamble detection and decoding processor shown in FIG. 13.

As explained above for the example of the receiver shown in FIG. 11a, a preamble detector and decoder 430 is configured to detect the preamble symbol and to recover the signalling data from the preamble symbol. To this end, the preamble detector and decoder 430 detects the preamble by detecting the signature sequence and then removes the signature sequence before recovering the signalling data from the preamble. Example embodiments of the preamble detector and decoder 430 are illustrated in FIGS. 12, 13 and 14.

Embodiments of the present technique can provide a receiver which detects the signature sequence and removes the signature sequence in the frequency domain or in the time domain. FIG. 12 provides a first example in which the signature sequence is removed in the frequency domain. Referring to the example receiver shown in FIG. 11a, the received base band signal is fed from a receive channel 428 to a matched filter 502 and a demodulator 550. The match filter 502 receives the signature sequence in the time domain after a signature sequence generator 504, which is the same as the signature sequence generator 212 at the transmitter, re-generates a copy of the signature sequence. The matched filter 502 is configured to have an impulse response which is matched to the time domain signature sequence. As such, it correlates the time domain signature sequence with the received signal fed from the receive channel 428 and the correlation output result can be used to detect the presence of the preamble OFDM symbol when an output of the correlation process exceeds a predetermined threshold. Furthermore, as a result of the presence of the signature sequence in the preamble OFDM symbol, an impulse response of the channel through which the received signal has passed can also be estimated from the correlation output of the matched filter by a channel impulse response estimator 508. The receiver can therefore include an arrangement for estimating the channel impulse response using the signature sequence without recourse to the traditional scattered pilots.

Having detected the presence of the signature sequence and estimated the channel impulse response, the effect of the channel impulse response can be removed from the received signal within the demodulator 550. Accordingly a Fast Fourier Transformer 518 transforms the channel impulse response estimate into the frequency domain channel transfer function and feeds the channel transfer function to an equaliser 516 within the demodulator 550.

Figure 12:
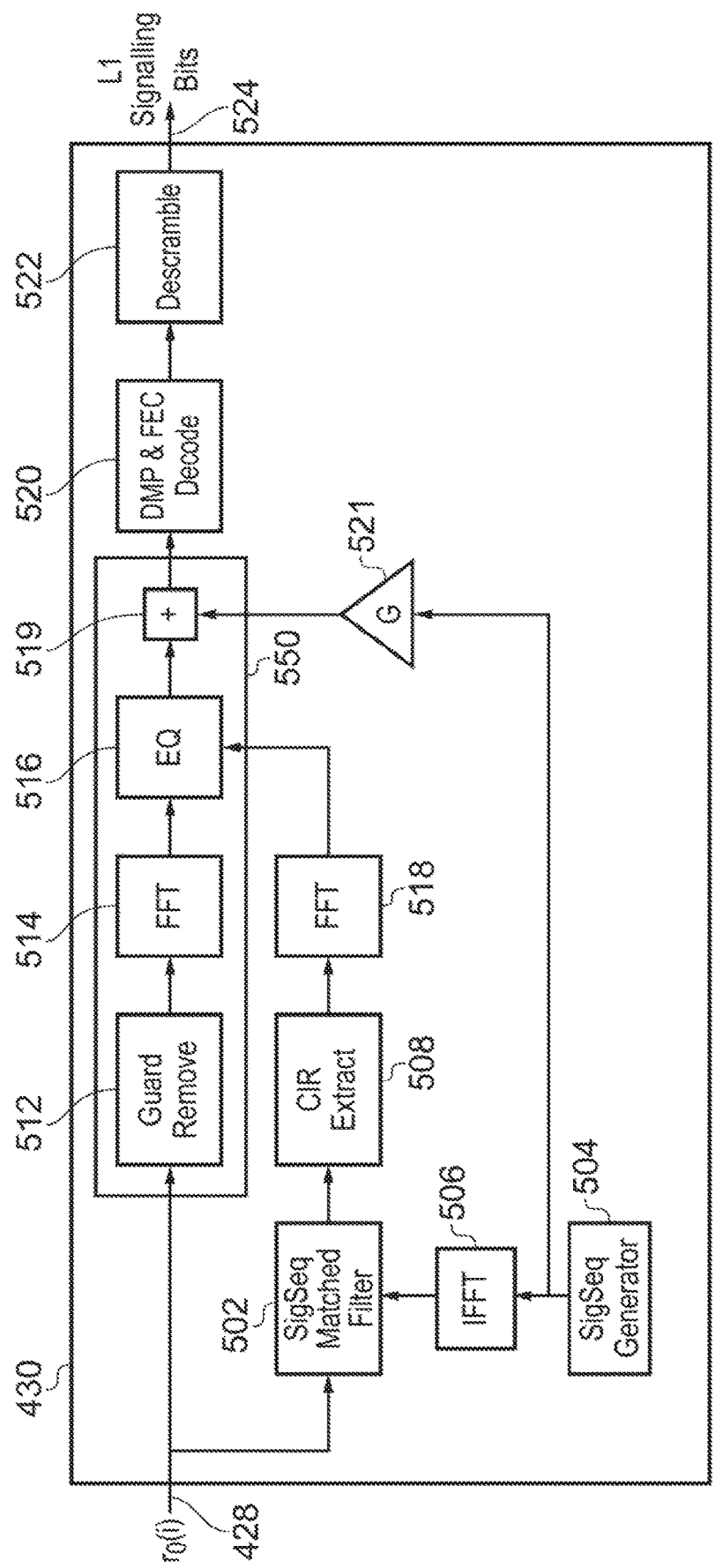
FIG. 12 is a schematic block diagram of one example of a preamble detection and decoding processor which forms part of the receiver shown in FIG. 11a, which detects and removes the signature sequence in the frequency domain.

In the receiver shown in FIG. 12 the demodulator 550 is arranged to recover the signalling data in a base band form encoded with an error correction code. The demodulator 550 therefore recovers the signalling data from the signalling (preamble) OFDM symbol, which is then decoded using a forward error correction decoder 520 before being descrambled by a descrambling unit 522 which corresponds to the scrambling unit 200 shown in FIG. 6 but performs a reverse of the scrambling.

The demodulator 550 includes a guard interval remover 512, which removes the guard interval from the signalling OFDM symbols, and an FFT unit 514, which converts the time domain samples into the frequency domain. The equaliser 516 removes the effects of the channel impulse response, which has been converted into the frequency domain to form a channel transfer function by the FFT unit 518 as already explained above. In the frequency domain the equaliser 516 divides each signalling data carrying OFDM sub-carrier by its corresponding channel transfer coefficient to remove, as far as possible, the effect of the transmission channel from the modulation symbols.

A signature sequence remover is formed by an adder unit 519 which receives the signature sequence in the frequency domain generated by the signature sequence generator 504 after this has been scaled by the scaling factor G, as explained above by a scaling unit 521. Thus the signature sequence remover 519 receives at a first input the equalised preamble OFDM symbol and on a second input a scaled signature sequence in the frequency domain and subtracts one from the other to form at the output estimates of the modulation symbols which were carried by the data bearing subcarriers of the preamble OFDM symbol.

The modulation symbols representing the error correction encoded preamble signalling data are then demodulated and error correction decoded by the demodulator and FEC decoder 520 to form at an output the scrambled bits of the L1 signalling data which are then descrambled by the descrambling unit 522 to form as an output 524 the L1 signalling data bits.

A further example of the preamble detector and decoder 430 which operates in the time domain to remove the signature sequence is showing in FIGS. 13 and 14. FIG. 13 provides an example of the preamble detector and decoder 430 which corresponds to the example shown in FIG. 12 and so only differences with respect to the operation of the example shown in FIG. 13 will be explained. In FIG. 13 as with the example in FIG. 12 the baseband received signal is fed to a signature sequence matched filter 502 and to a demodulator 550. As with the example shown in FIG. 12, the signature sequence matched filter cross-correlates the received signal with an impulse response which is matched to the time domain signature sequence. The signature sequence is received in the time domain form by regenerating the signature sequence in the frequency domain using the signature sequence generator 504 and transforming the signature sequence into the time domain using an inverse Fourier transform processor 506. As with the example shown in FIG. 12 a channel impulse response estimator 508 detects the channel impulse response from the output of the signature sequence matched filter 502 and forms this into the frequency domain channel transfer function using an FFT unit 518 to feed the frequency domain channel estimate to an equaliser 516 within the demodulator 550.

So far the operation of the example shown in FIG. 13 corresponds to that shown in FIG. 12. As shown in FIG. 13 the demodulator 550 includes the signature sequence remover 559 at before the guard remover 512. The time domain signature sequence which is fed from the inverse Fourier transform unit 560 is sealed by the scaling unit 521 by the predetermined factor G. The sealed time domain signature sequence is then fed to the signature sequence remover 559 which removes the signature sequence in the time domain from the received baseband signal. Thereafter the guard remover 512, the FFT unit 514 and the equaliser 516 operate in a corresponding way to the elements shown in FIG. 12.

Figure 15B:
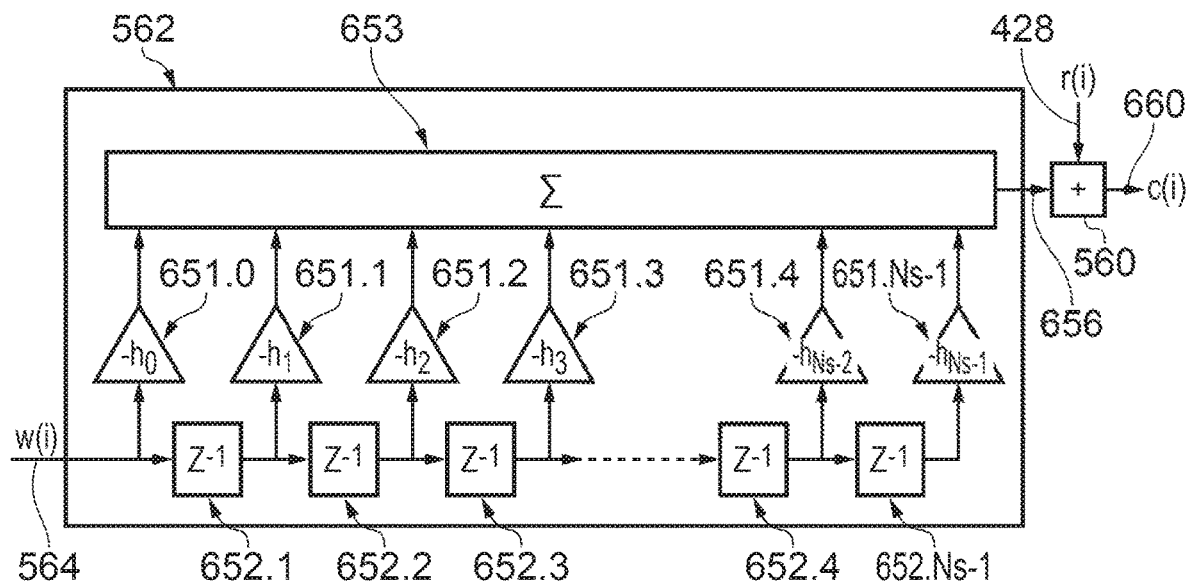
FIG. 15b is a schematic block diagram of a signature sequence remover forming part of the receiver shown in FIG. 14.

The signature sequence remover 559 shown in FIG. 13 is shown in more detail in FIG. 14. In FIG. 14 the signature sequence remover 559 comprises a guard interval inserter 561, a combiner unit 560 and an FIR filter 562. The time domain baseband received signal is received on the input channel 428 at one input of the combiner unit 560. A second input 564 receives the scaled time domain version of the signature sequence, which is fed to the guard interval inserter 561 which prepends a cyclic prefix to the signature sequence in much the same way as the guard interval inserter 561 42 at the transmitter. The output of the guard interval inserter feeds the FIR filter 562 which receives on a second input 566 the estimate of the channel impulse response generated the channel impulse response extraction block 508. 502. The FIR filter 562 therefore convolves the channel impulse response estimate with the signature sequence in the time domain which is then subtracted by the combiner 560 from the received baseband signal to remove the effect of the signature sequence from the received signal. FIG. 15b shows a more detailed example implementation of this signature sequence removal and how the FIR filter 562 is configured.

As will be appreciated the operation of the demodulator and FEC decoder 520 and the scrambler 522 perform the same functions as explain with reference to FIG. 12.

Matched Filter

As indicated above the matched filter 502 generates an output signal which represents a correlation of the received signal with the signature sequence. A block diagram showing an example of the signature sequence matched filter 502 is shown in FIG. 15a.

FIG. 15a shows a sequence of Ns delay elements 600 connected to scaling units 602 which scale each of the samples of the data stored in the delay storing unit 600 by a corresponding component of the signature sequence P(n) but conjugated. The output from each of the sealing units 602 is then fed to an adding unit 604 which forms an output signal representing a correlation of the received signal samples r(n) with the signature sequence at an output 606. The matched filter implements the equation:

$$g(i) = \sum_{n=0}^{N_s-1} P*(n)r(n+1) \text{ for } i = -Ns+1,$$
$$-Ns+2 \ldots, 0, 1, 2, \ldots Ns-1$$

When the filter taps P(i) are of form (±1±j1), the multiplier at each tap could simply be done by adding and subtract circuits for each of the in-phase and quadrature components. When the signature sequence is a CAZAC sequence, the quadrature components of P(i) are not bipolar. The scaling units 602 can use the sign of each quadrature component instead so as to have the form (±1±j1).

Figure 16A:
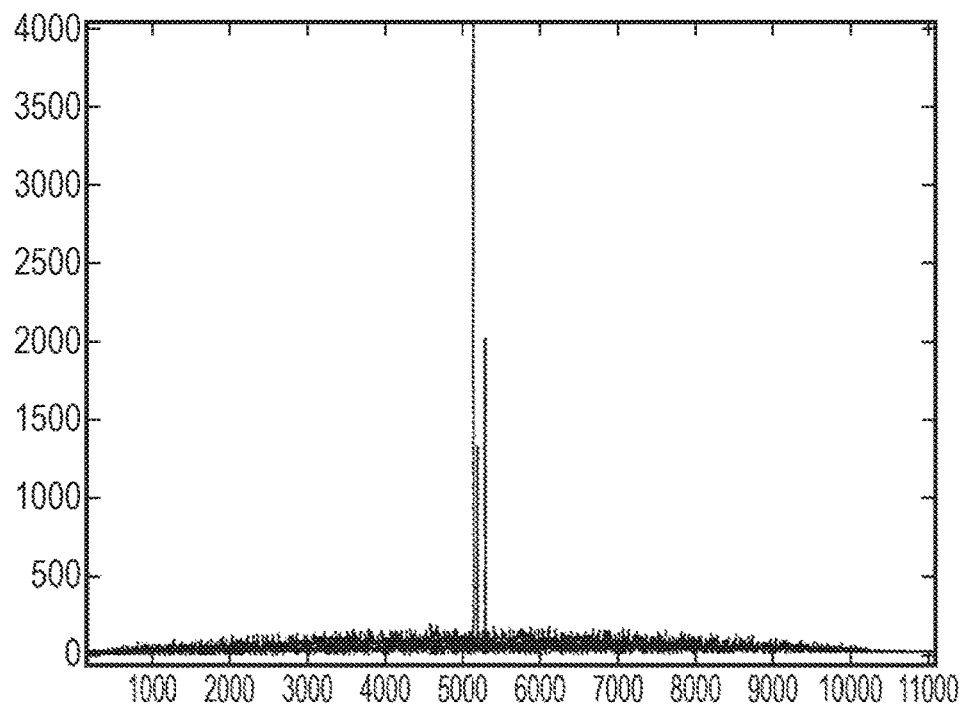
FIG. 16a is a graphical representation of a signal formed at the output of the matched filter.
Figure 16B:
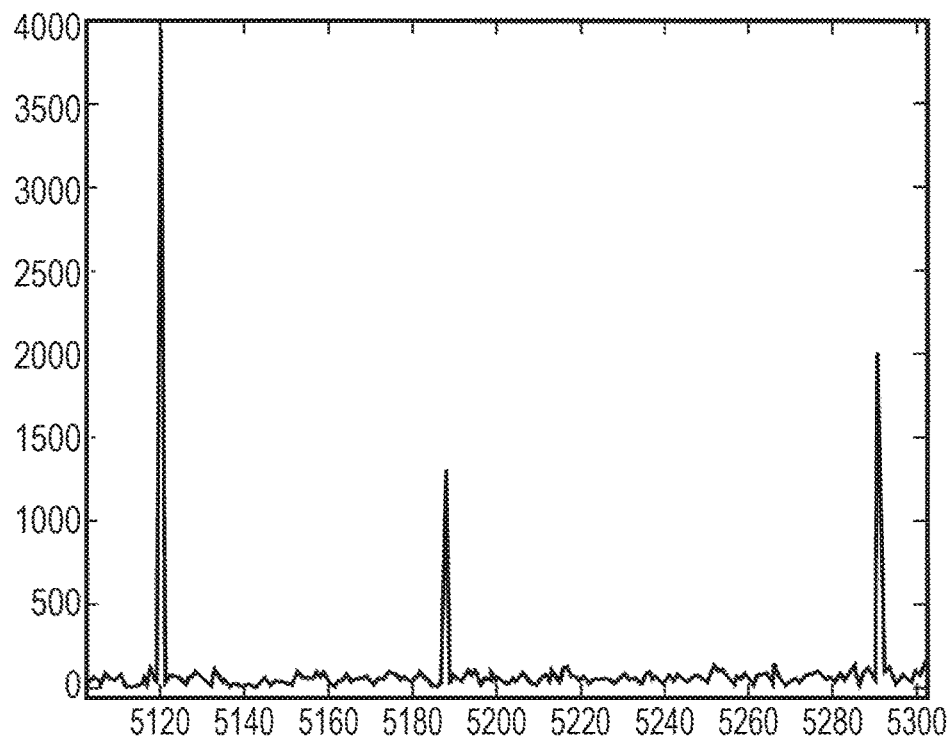
FIG. 16b is an expanded view of the graphical representation shown in FIG. 16a illustrating components of a channel impulse response.

FIG. 16a and FIG. 16b provide examples of a correlation output of the match filter for a multipath environment. In this case the channel is composed of three paths and the preamble is a 4K symbol with GIF of ¼ for illustrative purposes only. As can be seen there is a clear correlation peak when the signature sequence of the received signal coincides with the signature sequence at the receiver. The example shown in FIG. 16b shows the output of the matched filter but with a more expanded x-axis showing an increase in resolution which is expanded from the correlation peak shown in FIG. 16a. For this channel, there are three paths as tabulated in the Table below:

TABLE 3

Multipath profile of example channel

| Path | Delay(us) [samples] | Power(dB) |
|---|---|---|
| 1 | 0 [0] | 0 |
| 2 | 10 [68] | −10 |
| 3 | 25 [171] | −6 |

Channel Impulse Response Extractor

As can be seen from FIG. 16b, both the amplitudes of the main impulses and their relative delays coincide with the characteristics of the multipath channel profile through which this particular signal propagated. To detect the actual channel paths, a threshold of energy detection is set to an appropriate multiple of the root mean square (RMS) level of the matched filter output within a window ±Ns of the highest amplitude output sample. The exact multiple of the RMS is chosen experimentally depending on the lowest signal to noise ratio under which the system is to work. Any sample of the matched filter output above this threshold is taken as a channel path, and all other samples are then set to zero in the channel impulse estimator 508. Finally, the channel impulse response (CIR) is normalised by dividing all its samples with the highest amplitude sample. In this way, the relative amplitudes and delays of each of the impulses in the channel through which the received signal has passed can be estimated.

Signature Sequence Remover

Having formed an estimate of the channel impulse response, a component of the received signal corresponding to that contributed by the signature sequence in the received signal can be generated by passing the received signal r(i) through the signature sequence remover 559, which is configured with filter taps $h_n$ to reflect the delay and amplitude profile of the channel impulse response. This can be accomplished by suitable scaling, shifting and adding of the signature sequence of length Ns=Nu+Ng of the preamble symbol. An example of the filter is shown in FIG. 15b.

As shown in FIG. 15b, the signature sequence remover 559 includes a finite impulse response (FIR) filter 562 made up of a delay line comprised of Ns−1 delay elements 652.1, 652.2, to 652.Ns−1. The output of these delay elements are connected to corresponding gain terms 651.1, 651.2, to 651.Ns−1 each of which gain stages feed their output to the adder 653. The input 654 of the filter is connected both to the input of delay element 652.1 and to the input of gain term 651.0. The output 656 of the FIR filter 650 is connected to the input of an adder 560 whose other input 657 receives the received preamble signal samples r(i). During operation, the gain stages of the FIR filter are set to the negative values of the samples of the channel impulse response derived by the channel impulse response estimator 506. The FIR 650 generates at an output 656 a signal representing the convolution of the signature sequence by the channel impulse response estimate, which effectively provides an estimate of the effect of the channel on the signature sequence imposed upon the signalling OFDM symbol. An adder 560 then subtracts the output signal of the FIR 656 from the received signal from an input 657 to remove the effect of the signature sequence from the received signal to form an output 660. Therefore a result (of the signature sequence transiting the channel described by the channel impulse response) is subtracted from the received signal by the signature sequence remover 510 with a delay matched to the point from which the first significant impulse (of the output of the matched filter) occurred. This process can be iterated in that the matched filter 502 can be re-run with the results of the subtraction, the channel impulse response re-estimated by the channel impulse response estimator 508 and the its effect on the signature sequence being extracted again by the signature sequence remover 559. As a result, a more accurate estimate of the effect of the signature sequence on the received signal can be estimated and subtracted from the received signal. Channel impulse responses from all iterations can then be summed and normalised to provide an improved estimate of the channel impulse response from which the channel transfer function (CTF) is derived for preamble symbol equalisation.

Frequency Offset Estimation

Figure 17:
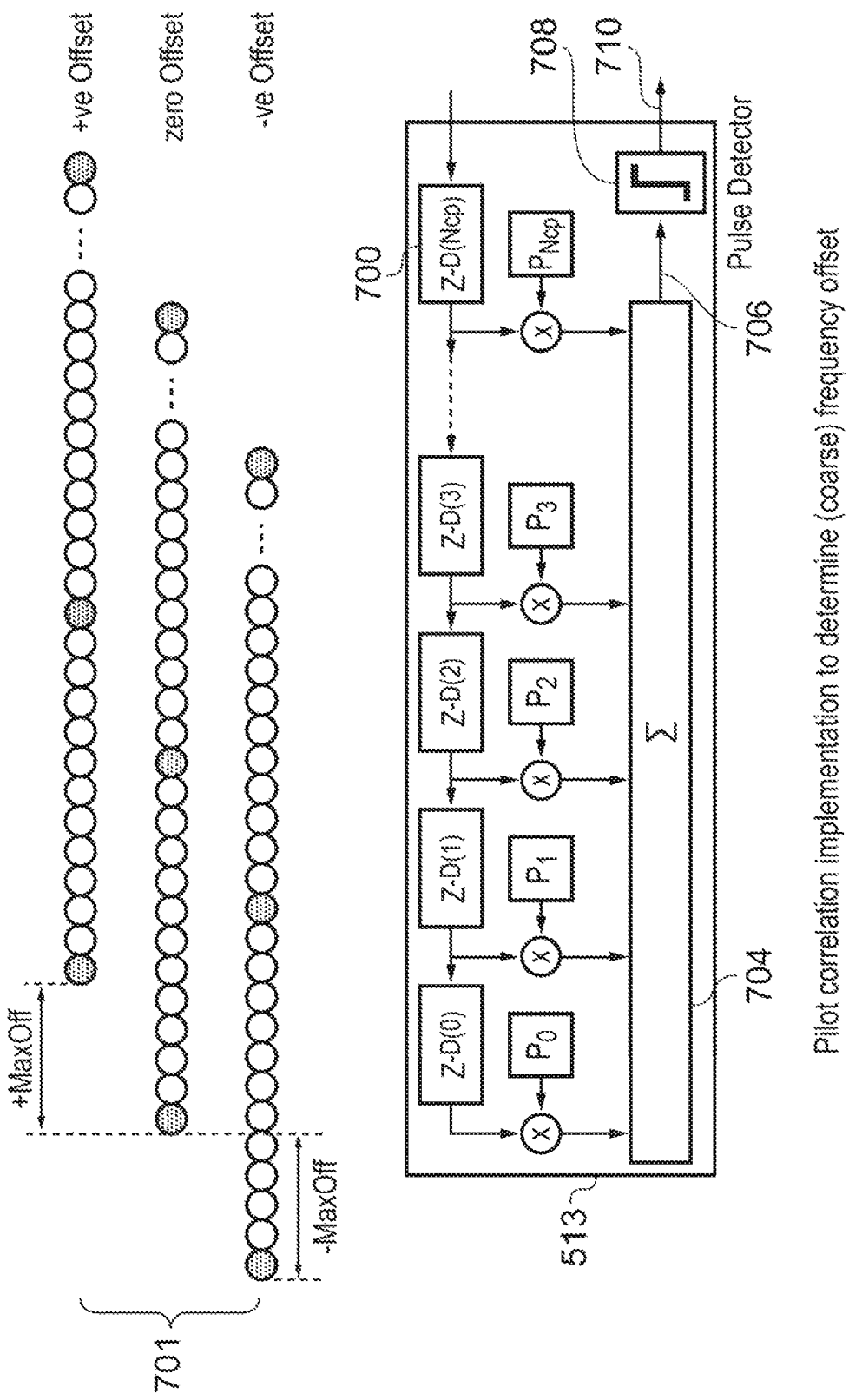

FIG. 17 provides a more detailed schematic block diagram of the preamble pilot matched filter 444 used for detecting a coarse Frequency offset in the received signalling OFDM symbol, which may form part of the frequency synchroniser 424 of FIG. 11a. As explained above, the number of pilots introduced into the signalling OFDM symbol is less than the number which would be required in order to estimate the channel. The number of pilot symbols is therefore set to estimate a coarse frequency offset. The block diagram shown in FIG. 17 provides an example representation of the coarse frequency remover 513 and is shown with three versions of the received preamble signal 701.

As shown in FIG. 17 a sequence of delay elements 700 are used to feed in discrete samples of the signal which are then multiplied by multipliers 702 with the known pilot signal values P(n) and summed by a summing unit 704 to form a correlation output 706. A pulse detector or peak detector 708 is the same one shown as 446 in FIG. 11b which then generates an output signal on channel 710 showing a peak when there is a coincidence between a relative offset of the received signal with the company of the pilot signals at the receiver. Shaded circles of each received signal 701 show sub-carrier cells that represent preamble pilots whilst the un-shaded cells show non-pilot sub-carrier cells. All subcarrier cells are shifted into the transversal filter from right to left. The parameter MaxOff is a design parameter that represents the maximum value of the frequency offset in units of sub-carrier spacing $\Omega$ that the designer may expect. The output of the pulse detector is only valid between shifts (0.5(Na+Nu)−MaxOff) and (0.5(Na+Nu)+MaxOff) where Na is the number of sub-carriers (out of a total of Nu) used in the preamble OFDM symbol. If the shifts are numbered from −MaxOff to +MaxOff then the pulse detector output will go high for the shift that corresponds to the observed frequency offset.

Once $\Omega$ is detected, this coarse frequency is removed by shifting the subcarriers by −$\Omega$ i.e. in the opposite direction to the frequency offset. This can also be removed prior to FFT in common with the fine frequency offset estimated from the preamble detection matched filter or guard interval correlation 432 by modulation with a suitably phased sinusoid generated by the oscillator 426 in FIG. 11a. The two frequency offsets can be used to start off the carrier correction loop for the rest of the OFDM symbols in the frame.

Figure 18:
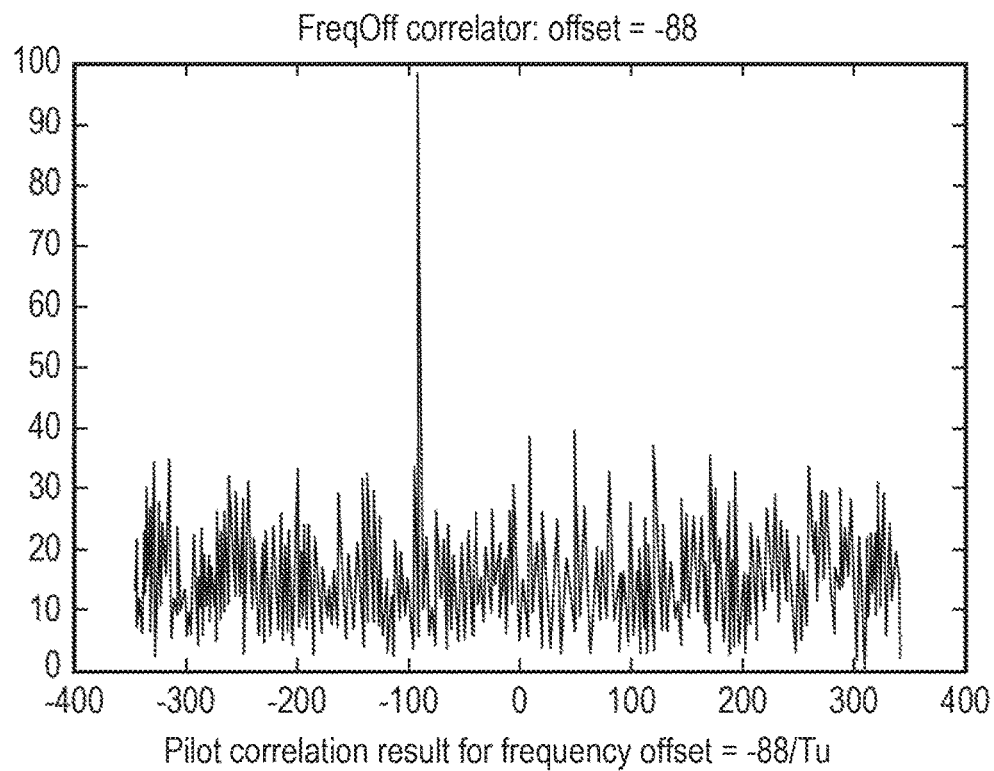
FIG. 18 is a graphical plot of the correlation output of the circuit shown in FIG. 17 for a frequency offset of −88/Tu.

FIG. 18 shows a pilot correlation result of a frequency offset in an example plot of the input of the pulse detector for a frequency offset of $\Omega$=−88 in a case where MaxOff is set to 350. The pulse detector might use a threshold to clip this input as a detector of the presence or absence of a substantial pulse.

Preamble Symbol Equalisation

After signature sequence removal from the received samples and the coarse frequency offset has been adjusted, OFDM equalisation can begin with the FFT of the received sequence. The FFT window starts from a trigger position in the FFT unit 514 corresponding to the relative delay of the first impulse in the channel impulse response estimate. If the channel impulse response estimate duration is longer than the preamble GID, then the trigger position is altered to ensure that it starts at the beginning of a Ng (Ng is the number of time domain samples in the guard interval of the preamble symbol) long window under which the maximum of the energy of the channel impulse response estimate falls. The Nu point FFT produces the preamble OFDM symbol in the frequency domain with the effect of the channel superposed. Before equalisation and decoding, any frequency offsets have to be calculated and removed by the frequency offset remover as explained above with reference to FIGS. 11a, 11b, 11c. This estimation uses correlation with the known preamble pilots to determine how far to the right or left the full symbol is shifted in frequency. Equalisation of the preamble OFDM symbol requires a channel transfer function (CTF). This is derived by executing a Nu point FFT on the channel impulse response estimate by the FFT unit 518. This provides a channel transfer function for all subcarriers in the preamble OFDM symbol allowing subcarrier by subcarrier one-tap equalisation to take place. Finally, the equalised data subcarriers are extracted (pilot subcarriers discarded) and de-mapped, forward error correction (FEC) decoded to provide the signalling.

Selected Results

Figure 19:
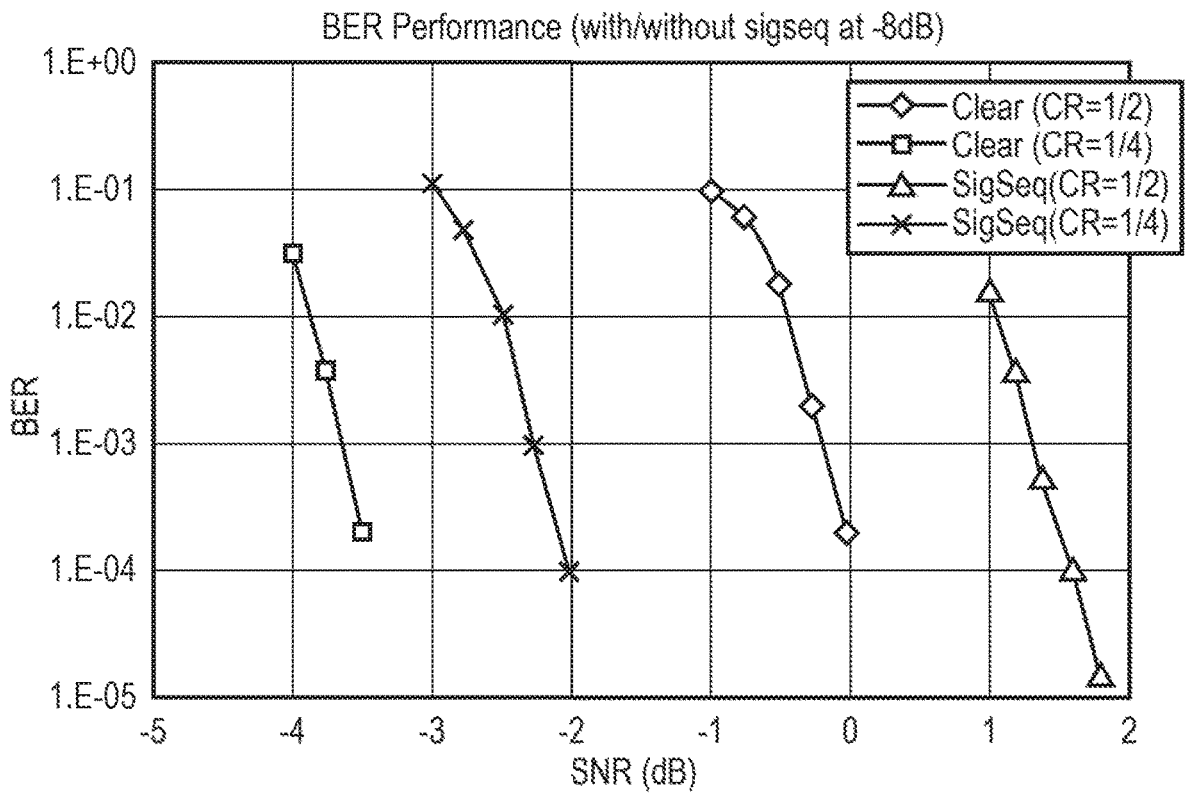
FIG. 19 provides a graphical plot of bit error rate with respect to signal to noise ratio for different code rates with and without a signature sequence added to the signalling OFDM symbol for rate one half and rate one quarter codes.

FIG. 19 provides a graphical plot of bit error rate with respect to signal to noise ratio for different code rates with and without the addition of the signature sequence to the signalling OFDM symbol. Thus, two code rates are shown, rate one half and rate one quarter, each code rate including the example of the presence of the signature sequence and without the signature sequence. As can be seen, the results for rate one quarter show that the signalling OFDM symbol can be detected even at signal to noise ratios of less than −2 dBs.

Figure 20A:
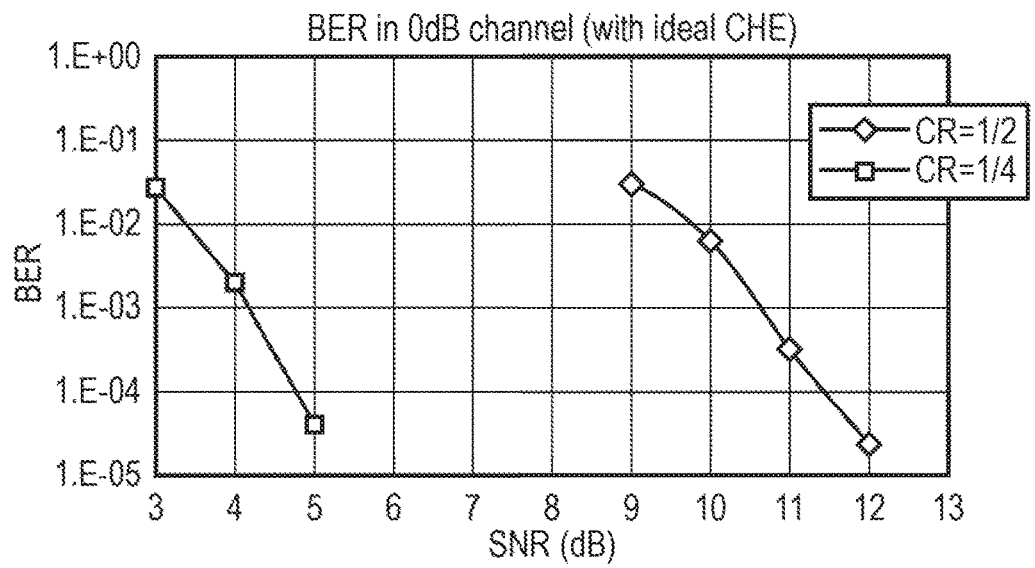
FIGS. 20a and 20b provide graphical plots of bit error rate against signal to noise ratio for a 0 dB echo channel with two paths as illustrated in FIG. 20c respectively with ideal and actual channel estimation.
Figure 20B:
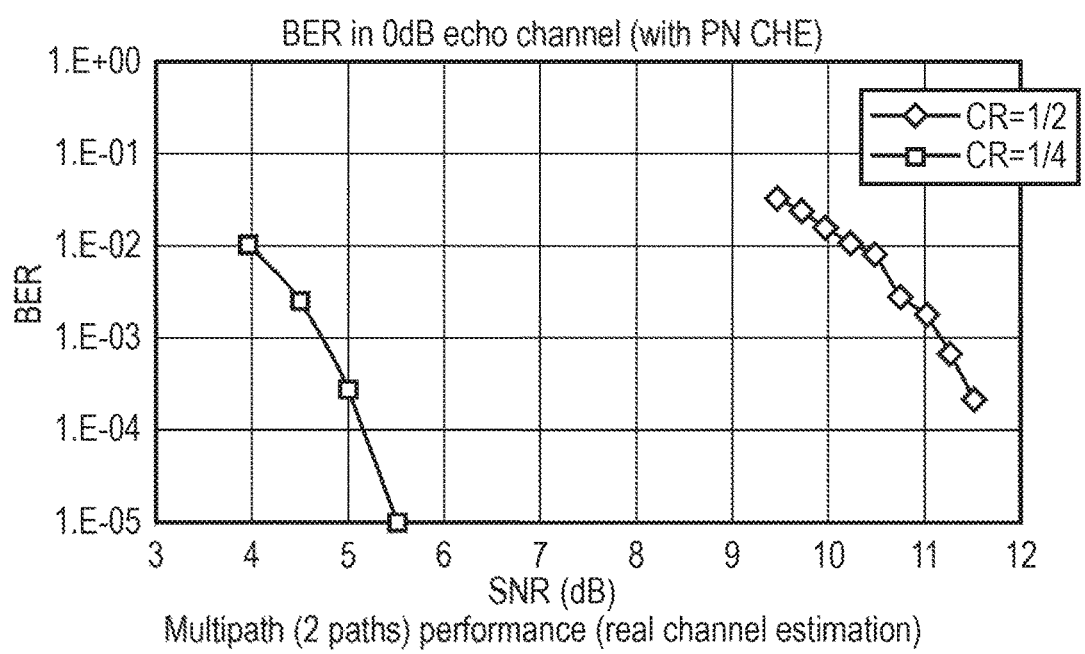
Figure 20C:
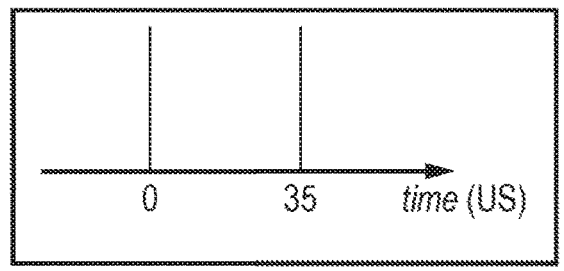

Two further sets of results shown in FIGS. 20a and 20b provide a graphical plot of bit error rate against signal to noise ratio in which for the results shown in FIG. 20a there is a 0 dB echo channel with an ideal channel estimation and in FIG. 20b a multipath environment with two paths as illustrated in FIG. 20c. Thus for FIG. 20b in contrast to the result shown in FIG. 20a there is a relative degradation in performance resulting from real channel estimation. However, as can be seen, the results are comparable.

Messaging by Choice of Signature Sequence

Embodiments of the present technique can also provide an arrangement in which the choice of signature sequence is in itself a signalling message representing information such as the presence or absence of a warning message within the layer one signalling data or payload. An example of a transmitter for generating a preamble symbol which includes signalling messages according to the present technique is shown in FIG. 21a.

Figures 21A, 21B:
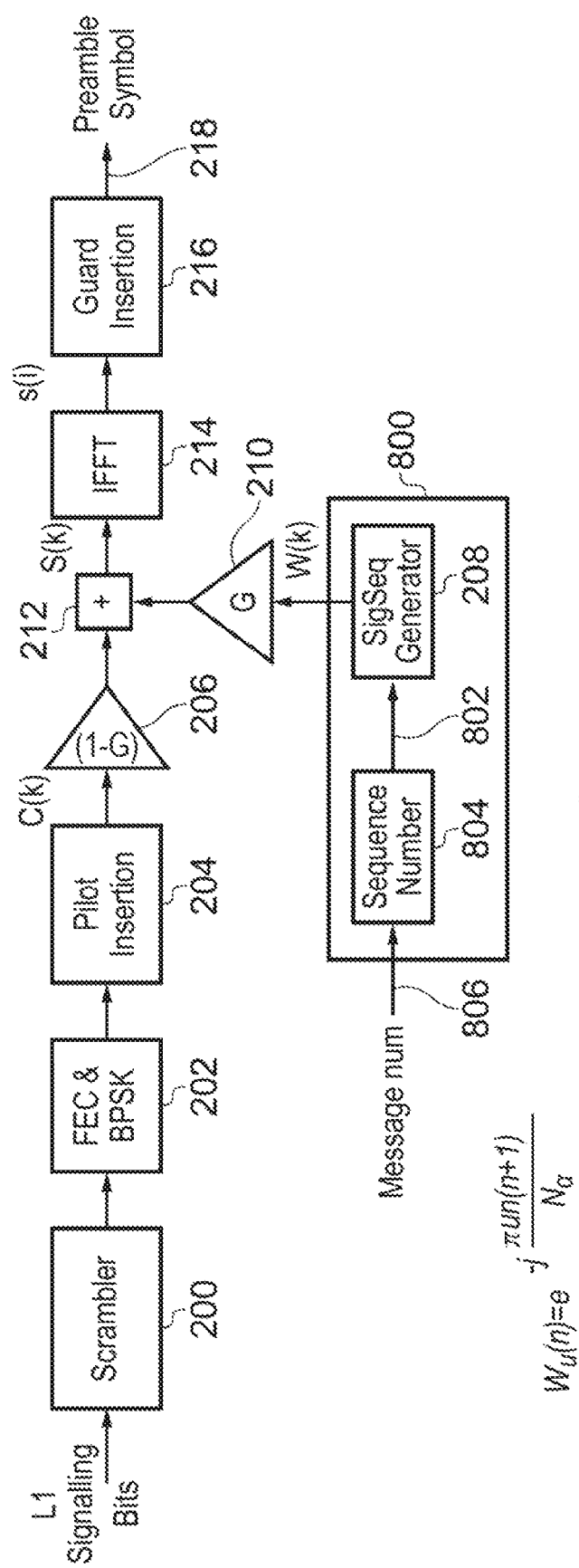

FIG. 21a shows the transmitter presented in FIG. 6 with a further adaptation to adapt the transmitted preamble to convey additional signalling messages. Since the transmitter of FIG. 21a is based on the transmitter described above and shown in FIG. 6 only the differences will be explained and the same parts as the transmitter of FIG. 6 have the same numerical references.

As shown in FIG. 21a, the signature sequence generator 208 forms part of a signalling sequence processor 800 which includes, with the signature sequence generator 208 a sequence number controller 804. The input 802 to the signature sequence generator 208 receives the output from the sequence number controller 804. The sequence number controller input 806 represents the message that the transmitter would like to convey to receivers within the network. The signature sequence generator 208 is configured to be able to generate one of N+1 possible sequences. A given number $0 \leq i \leq N$ on the input 802 of the signature sequence generator 208 causes the signature sequence generator 208 to output the sequence whose cardinal number is i from amongst its set of signature sequences. The output of one or other of the signature sequences from generator 208 conveys a pre-determined message to all receivers in the network that receive the signal. In one example the message represents an early warning signal (EWS). In this example, N=1. For example, when there is need to convey an early warning signal (EWS) to all receivers, the input 806 to the signature sequence processor 800 carries a 1. Accordingly, the sequence number controller 804 outputs '1' onto input 802 of the signature sequence generator 208 which effect is to cause the signature sequence generator 208 to generate signature sequence number 1 and output this to the gain block 210. When there is no EWS to be conveyed, the input 806 to the signature sequence processor 800 carries a '0'. Accordingly, the sequence number controller 804 outputs '0' onto input 802 of the signature sequence generator 208 which effect is to cause the signature sequence generator 208 to generate signature sequence number zero and output this to the gain block 210. In this example, all receivers within the network detecting signature sequence '1' determine that this represents an EWS further information about which is carried as part of the layer one signalling data and the rest in the payload of the frame. The receiver can then take further action to decode and interpret the emergency information. On the other hand, receivers detecting signature sequence number zero would determine that there are no current emergencies imminent and so continue to decode and display the audio-visual information in the payload of the frame.

In another example the signature sequence generated by the signature sequence generator 208 is one of a predetermined set of sequences which represent as many messages as there are signature sequences generated by the signature sequence generator 208. In order to communicate each of these messages the message number of input 806 is arranged to be the required signature sequence number which the signature sequence generator 208 uses to select one of the signature sequences from its predetermined set of signature sequences. The selection of the signature sequence is therefore representative of a different one of a corresponding predetermined set of messages which thereby conveys information which may be a particular warning message, such as a tsunami warning or may be a message for a different purpose. Each message can provide different information. For example in a N=4 message system, message 1 could be an early warning of a possible emergency situation, such as an approaching hurricane or tsunami while message 2 could be an indication of an all-clear prior to the normal state represented by message 0 which requires no particular action. The early warning signal could trigger the receiver to display a message or audible warning instructing users of the device to evacuate a building for example. Thus a receiver could detect the message 1 and generate audible or visual output to the users to provide a warning. Similarly messages message 3 and message 4 could provide similar broadcast information, such as public safety announcement, radio traffic announcements or flooding. As will be understood, the choice of sequence thereby represents one of the messages selected and therefore conveys information.

Returning to FIG. 21a and assuming a system with N=1 which represents a system with only one message for example one with only 'normal operation' and 'impending disaster' messages, the table shown in FIG. 21b shows example parameters for generating the two signature sequences required. To generate each sequence, the sequence generator 208 will use the corresponding set of parameters {u, Na} in the CAZAC sequence generator equation shown.

FIG. 22 provides a conceptual representation of the operation of the guard insertion unit 216 when operating in combination with the signalling sequence processor 800. As shown in FIG. 22, the OFDM symbol for example for 8K mode which is fed to an input of the scaling unit 206 is formed from samples including the useful part of the OFDM symbol 850 and the guard interval samples 852. The first signature sequence 854 or the second signature sequence 856 is selected under the control of the sequence number controller 804. The mapping of the guard interval from the useful part of the OFDM symbol is shown from the examples for the message sequence and the signature sequence 854, 856.

Figure 23:
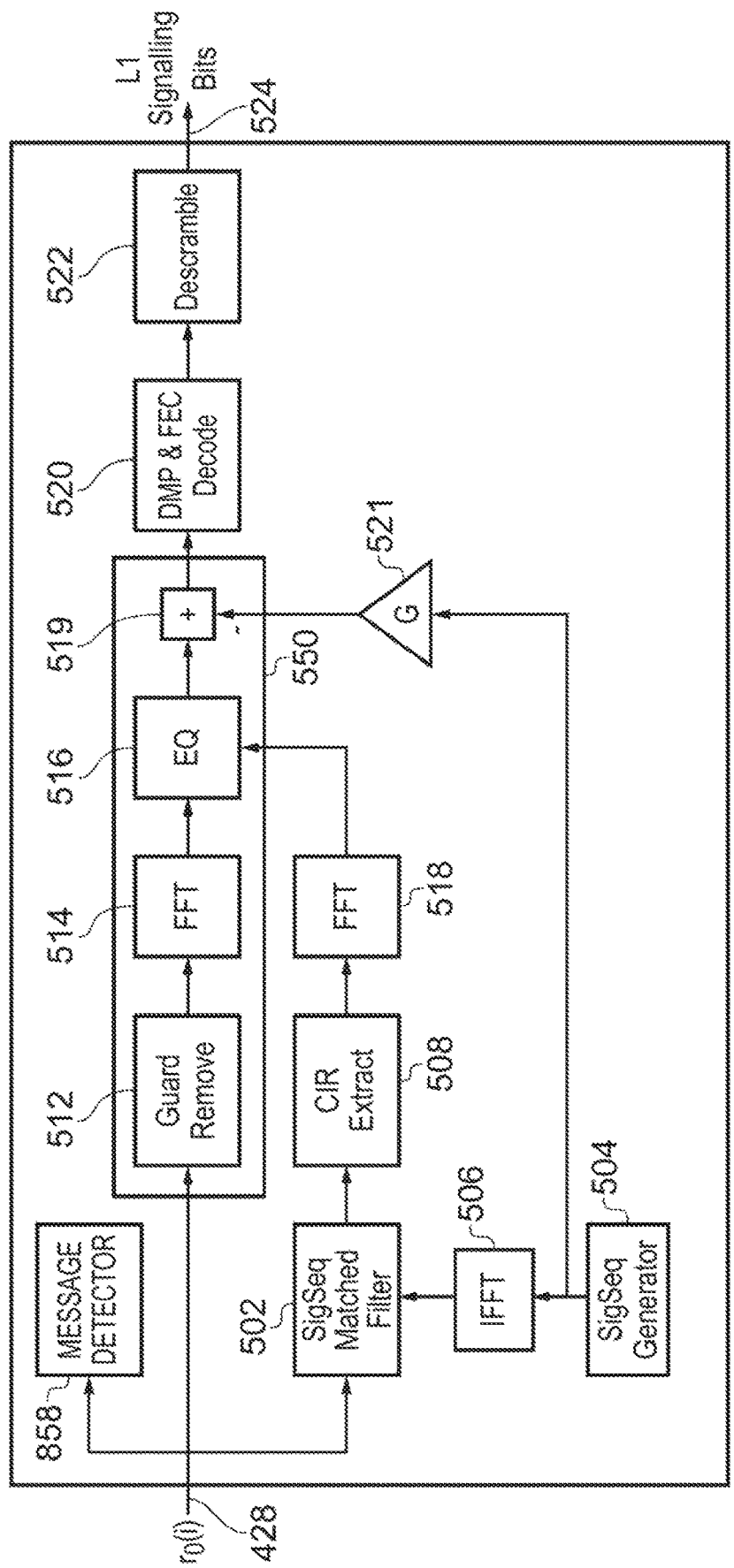

A receiver which has been adapted in accordance with the present technique to detect and decode a message provided by the message sequence transmitted by the transmitter shown in FIGS. 21 and 22 is provided in FIG. 23. FIG. 23 corresponds to the receiver shown in FIG. 12 for the example of the frequency domain signature sequence removal. However, as will be appreciated a corresponding adaptation can be made to the receiver which removes the signature sequence in the time domain as shown in FIGS. 13 and 14.

As shown in FIG. 23 the receiver includes a message detector 858. The message detector 858 is shown in more detail in FIG. 24. As shown in FIG. 24 the received signal is fed to the message detector 858 after the frequency offset has been removed by the receiver as shown in FIG. 11a. Thus the message detector 858 comprises first and second branches 860, 862 in which two matched filters are present 864, 866. The first matched filter 864 corresponds to the matched filter 502 shown in FIGS. 12 and 13 and has an impulse response which is matched to that of the signature sequence '0' for detecting the preamble symbol in 'normal operation'. The second matched filter 866 is matched to the signature sequence '1' which may be transmitted to provide for example an early warning message. The outputs from the first and second matched filters 864, 866 are fed to first and second inputs of a comparator 868 which outputs an indication as to which of the two signature sequences was better matched to the received signal. Depending upon whether the degree of the better match exceeds a given threshold a selector 870 then initiates further processing of the input data to extract more information about the emergency in unit 872 or terminates at 874. If the preamble symbol is carrying the signature sequence '0' indicating 'normal operation' then no further processing of the signal for emergency extraction purposes is required. However if the EWS sequence is detected then the further emergency processing is in general done by the processor 872.

According to the present technique it will be appreciated that because the signature sequence is designed to be detected first, with the detection of the preamble OFDM symbol in a frame, at lower signal to noise ratios than the payload data, early warning signalling by the method described above can provide an early warning which is more widely detectable than the payload data. Furthermore, because the EWS message can be detected independently of the payload data, a receiver can be configured to detect the EWS message even in a standby state or powered-off state by providing a small amount of power to only the part of the receiver (described above) which is configured to detect the EWS message.

Figure 25:
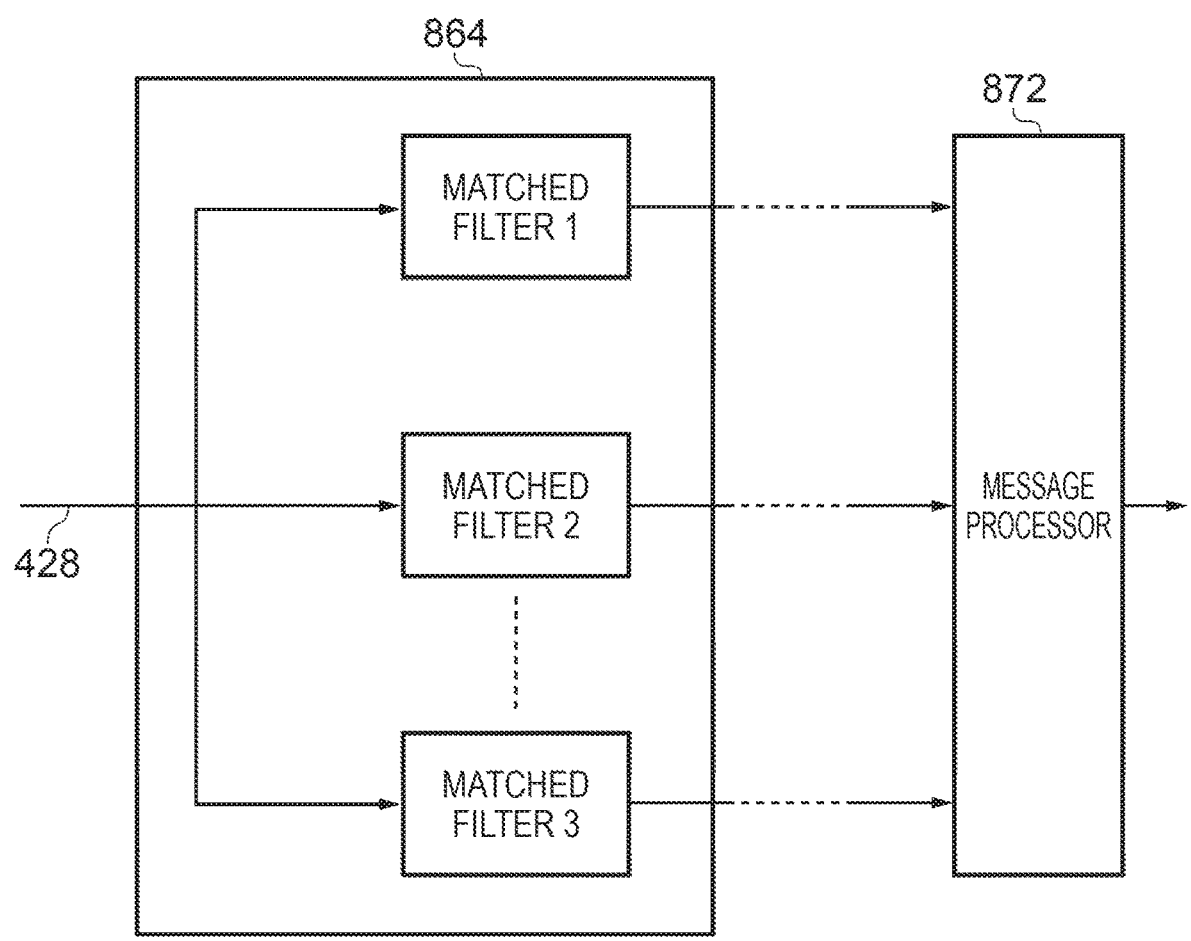
FIG. 25 is a schematic block diagram of a signalling decoder of the receiver shown in FIG. 23 providing an example embodiment of the present technique.

For the example in which more than one (N>1) possible messages may be conveyed, the message sequence marched filter 864 can be adapted as shown in FIG. 25 to include a bank of matched fitters 864.1, 864.2, 864.3 etc. For the example shown in FIG. 25, a matched filter 864.1, 864.2, 864.3 is provided for each of the possible N+1 signature sequences corresponding to message 0 ('normal operation), MESSAGE1, MESSAGE2, MESSAGE3, MESSAGE4, to MESSAGE N although it will be appreciated that this is a functional description and a software arrangement could be provided in which a matched filter is adapted to have a different impulse responses for each of the possible signature sequences. The message processor 872 receives the outputs from the respective matched filters 864.1, 864.2, 864.3 via the comparator 868 and the selector 870 and then extracts the appropriate message from the received signal according to which of the matched filters produces the highest output relatively. The output is however compared with a threshold to determine that the message was transmitted to avoid a false alarm due to the presence of noise. The message can therefore be detected by identifying one of the possible sequences of the set of signature sequences. Thus, by identifying the message sequence from a possible set of sequences the information conveyed by the message is identified. In one example the message sequence represents second signalling data, which may represent layer one signalling data and so may be fed to the preamble detector and decoder 430 for detecting and recovering the payload data.

According to one example embodiment, the signalling data may be used to identify a type of constellation which is used for carrying the layer one signalling in the signalling OFDM symbol. Thus, the second signalling data carried by the message sequence can represent a modulation scheme, for example, BPSK, QPSK, 16 QAM, or 64 QAM, which may be represented by different possible sequences of the message sequence. The modulation scheme therefore represents the way in which data has been modulated onto the signalling OFDM symbol. Thus, having detected the synchronisation sequence within the received signal to identify the signalling frame, the message processor 872 is used to detect the message sequence, the detected message sequence from for example four possible sequences each representing a different modulation scheme therefore provides the modulation scheme with which data is modulated onto the signalling OFDM symbol. Therefore, the message processor 872 feeds an output signal to the preamble detector and decoder 430 which is arranged to demodulate the data from the sub-carriers of the signalling OFDM symbol to thereby recover the signalling data which may represent layer one data of the preamble OFDM symbol.

For the example in which the message sequence is used to provide user level information such as an early warning message for a public safely broadcast, then the receiver could be arranged to provide power to the preamble detector and decoder 430 even in a powered off state or standby state so that the preamble detector and decoder 430 can be arranged to substantially continuously monitor the signalling messages. In some examples a battery may be used to provide power if the receiver is not connected to a mains electricity supply. In some examples where necessary the matched filter 502 may also be provided with power when the receiver is not in a powered on state so that the message sequence can be detected, although in other examples the preamble detector and decoder 430 may be configured to provide all necessary functionality to detect the message sequence and so may only need to be powered substantially continuously.

The following numbered clauses provide further example aspects and features of the present technique:

1. A transmitter for transmitting payload data using Orthogonal Frequency Division Multiplexed (OFDM) symbols, the transmitter comprising a frame builder configured to receive the payload data to be transmitted and to receive first signalling data for use in detecting and recovering the payload data at a receiver, and to form the payload data with the first signalling data into frames for transmission, a modulator configured to modulate a first OFDM symbol with the first signalling data and to modulate one or more second OFDM symbols with the payload data, a signature sequence processor for generating a signature sequence, a combiner for combining the generated signature sequence with the first OFDM symbol, and a transmission unit for transmitting the first and second OFDM symbols, wherein the signature sequence provided by the signature sequence processor is selected from one of a set of signature sequences, the signature sequence being combined by the combiner with the first OFDM symbol, so that a receiver can detect and recover the first signalling data from the first OFDM symbol and the signature sequences of the set provide message information to the receiver.

2. A transmitter according to clause 1, wherein the signature sequence processor comprises a signature sequence generator for generating the selected signature sequence from the set of the signature sequences and a sequence controller for selecting the signature sequence to be generated, wherein a first of the signature sequences is selected so that the first OFDM symbol can be detected and the first signalling data recovered before the one or more second OFDM symbols, and one or more other signature sequences of the set are selected to represent a different message.

3. A transmitter according to clause 1 or 2, wherein the first OFDM symbol is a first type having a different number of sub-carriers than the one or more second OFDM symbols of a second type.

4. A transmitter according to clause 2 or 3, wherein the signature sequence processor is configured to provide either the first synchronisation sequence for a receiver to use in detecting the first OFDM symbol before the one or more second OFDM symbols or to provide one of the other signature sequences from the set for detecting the first OFDM symbol and indicating a message to the receiver as one of a plurality of signature sequences, each sequence representing a difference message.

5. A transmitter according to clause 4, wherein the first synchronisation sequence and the each of the other message sequences each comprises a set of complex coefficients that are combined with the first OFDM symbol by adding each of the complex coefficients with a corresponding sample of the first OFDM symbol in the time domain.

6. A transmitter according to any of clauses 1 to 5, wherein the set of complex coefficients are based on a sequence generated using at least a first pseudo-random binary sequence generator configured to generate a real component of the complex coefficients, and at least a second pseudo-random binary sequence generator separately configured to generate the imaginary component of the complex coefficients.

7. A transmitter according to clause 6, wherein each pseudo-random binary sequence generator is formed from an M-sequence or Gold code sequence generator.

8. A transmitter according to clause 5 where in the set of complex coefficients of the signature sequences is generated using a constant amplitude zero autocorrelation sequence generator.

9. A transmitter according to any of clauses 1 to 8, wherein the information includes user level information such as a publicly broadcast early warning or the like/

10. A method of transmitting payload data using Orthogonal Frequency Division Multiplexed (OFDM) symbols, the method comprising
receiving the payload data to be transmitted,
receiving first signalling data for use in detecting and recovering the payload data to be transmitted at a receiver,
forming the payload data with the first signalling data into frames for transmission,
modulating a first OFDM symbol with the first signalling data,
modulating one or more second OFDM symbols with the payload data,
providing a signature sequence,
combining the signature sequence with the first OFDM symbol, and
transmitting the first and second OFDM symbols, wherein the providing the signature sequence comprises
selecting the signature sequence from one of a set of signature sequences, the selected signature sequence being combined with the first OFDM symbol, so that a receiver can detect and recover the first signalling data from the first OFDM symbol and the signature sequence selected from the set of signature sequences represents message information to the receiver.

11. A method according to clause 10, wherein the providing the signature sequence includes selecting the signature sequence front the set to be generated, and
generating the selected signature sequence from the set of the signature sequences, wherein a first of the signature sequences is selected so that the first OFDM symbol can be detected and the first signalling data recovered before the one or more second OFDM symbols, and one or more other signature sequences of the set are selected to represent different message information.

12. A method according to clause 10 or 11, wherein the first OFDM symbol is a first type having a different number of sub-carriers than the one or more second OFDM symbols of a second type.

13. A method according to any of clauses 11 to 13, wherein the providing the synchronisation sequence includes
providing either the first synchronisation sequence for a receiver to use in detecting the first OFDM symbol before the one or more second OFDM symbols, or
providing one of the other signature sequences from the set for detecting the first OFDM symbol and indicating a message to the receiver as one of a plurality of signature sequences, each sequence representing a difference message.

14. A method according to any of clauses 10 to 13, wherein the first synchronisation sequence and each of the message sequences comprise a set of complex coefficients and the signature sequence is combined with the first OFDM symbol by adding each of the complex coefficients with a corresponding one of the samples of the first OFDM symbol in the time domain.

15. A method according to any of clauses 10 to 14, wherein the set of complex coefficients are based on a sequence generated using at least a first pseudo-random binary sequence generator configured to generate a real component of the complex coefficients, and at least a second pseudo-random binary sequence generator separately configured to generate the imaginary component of the complex coefficients.

16. A method according to clause 16, wherein each pseudo-random binary sequence generator is formed from an M-sequence or Gold code sequence generator.

17. A method according to clause 15, wherein the set of complex coefficients of the signature or message sequences is generated using a constant amplitude zero autocorrelation sequence generator.

18. A method according to any of clauses 10 to 17, wherein the information includes user level information such as a publicly broadcast emergency warning or the like.

19. A receiver for detecting and recovering payload data from a received signal, the receiver comprising
a detector for detecting the received signal, the received signal comprising the payload data with first signalling data for use in detecting and recovering the payload data, the first signalling data being carried by a first Orthogonal Frequency Division Multiplexed, OFDM, symbol, and the payload data being carried by one or more second OFDM symbols, and the first OFDM symbol having been combined with a signature sequence,
a synchronisation detector for comprising a matched filter having an impulse response which has been matched to the signature sequence with the effect that an output of the matched filter generates a signal representing a correlation of the signature sequence with the received signal, and
a demodulator for recovering the first signalling data from the first OFDM symbol for recovering the payload data from the second OFDM symbols, wherein the signature sequence comprises one of a predetermined set of synchronisation sequences, which includes a first synchronisation sequence one or more second message sequences, the signature sequence having been selected and combined with the first OFDM symbol, the first synchronisation sequence being provided for a receiver to detect and to recover the first signalling data from the first OFDM symbol and the one or more second message sequences representing message information to the receiver, and the receiver including
a message detector for detecting and recovering the message information by identifying the second message sequence from amongst the set of second message sequences.

20. A receiver according to clause 19, wherein the message detector includes a second matched filter having an impulse response which has been matched to the differentially encoded designated message sequence, the message detector being configured to detect the presence of the second message sequence from processing the output of the second matched filter thereby decoding the message information.

21. A receiver according to clause 19 or 20, wherein the first OFDM symbol is a first type having a different number of sub-carriers than the one or more second OFDM symbols of a second type.

22. A receiver according to clause 19, 20 or 21, wherein the first synchronisation sequence and the second message sequence of the signature sequence each comprise a set of complex coefficients and the signature sequence is combined with the first OFDM symbol by adding each of the complex coefficients with a corresponding one of the samples of the first OFDM symbol in the time domain.

23. A receiver according to any of clauses 19 to 22, wherein the set of complex coefficients of the signature sequence is based on a sequence generated using at least a first pseudo-random binary sequence generator configured to generate a real component of the complex coefficients, and at least a second pseudo-random binary sequence generator separately configured to generate the imaginary component of the complex coefficients.

24. A receiver according to clause 23, wherein each pseudo-random binary sequence generator is formed from an M-sequence or Gold code sequence generator.

25. A receiver according to clause 23, wherein the set of complex coefficients of the signature or message sequences is generated using a constant amplitude zero autocorrelation sequence generator.

26. A receiver according to any of clauses 19 to 25, comprising a power supply and a controller, wherein the controller is configured in combination with the power supply to supply power to the signalling decoder, when the receiver is in a powered off or standby state when power is not supplied to some or all of the remaining parts of the receiver.

27. A method of detecting and recovering payload data from a received signal, the method comprising detecting the received signal, the received signal comprising time divided frames including the payload data with first signalling data for use in detecting and recovering the payload data, the first signalling data being carried by a first Orthogonal Frequency Division Multiplexed, OFDM, symbol, and the payload data being carried by one or more second OFDM symbols, and the first OFDM symbol having been combined with a signature sequence, filtering the received signal with a matched filter having an impulse response which has been matched to the signature sequence with the effect that an output of the matched filter generates a signal representing a correlation of the signature sequence with the received signal, detecting the first OFDM symbol from the output signal of the matched filter, and demodulating the first OFDM symbol to recover the first signalling data from the first OFDM symbol for recovering the payload data from the second OFDM symbol, wherein the signature sequence comprises one of a predetermined set of synchronisation sequences, which includes a first synchronisation sequence one or more second message sequences, the signature sequence having been selected and combined with the first OFDM symbol, the first synchronisation sequence being provided for a receiver to detect and to recover the first signalling data from the first OFDM symbol and the one or more second message sequences representing message information to the receiver, and the method including detecting and recovering the message information by identifying the second message sequence.

28. A method according to clause 27, the method comprising detecting the message information using additional matched filters each having an impulse response which has been matched to each of the set of second message sequences each differentially processed thereby correlating each of the second message sequences with the received first OFDM symbol, and detecting the message information from a highest correlation output from each of the matched filters in correspondence to the sequences in the predetermined set of sequences.

29. A method according to clause 27 or 28, wherein the first OFDM symbol is a first type having a different number of sub-carriers than the one or more second OFDM symbols of a second type.

30. A method according to any of clauses 27 to 29, wherein the first synchronisation sequence and the second message sequence of the signature sequence each comprise a set of complex coefficients and the signature sequence having been combined with the first OFDM symbol by adding each of the complex coefficients with a corresponding one of the samples of the first OFDM symbol in the time domain.

31. A method according to any of clauses 27 to 30, wherein the first synchronisation sequence and the second message sequence of the signature sequence each comprise a set of complex coefficients and the signature sequence having been combined with the first OFDM symbol by adding each of the complex coefficients with a corresponding one of the samples of the first OFDM symbol in the frequency domain.

32. A method according to clauses 30 or 31, wherein the the first synchronisation sequence comprises the set of complex coefficients of the signature sequence generated using at least a first pseudo-random binary sequence generator configured to generate a real component of the complex coefficients, and at least a second pseudo-random binary sequence generator separately configured to generate the imaginary component of the complex coefficients.

33. A method according to clause 32, wherein each pseudo-random binary sequence generator is formed from an M-sequence or Gold code sequence generator.

34. A method according to clause 32, wherein the set of complex coefficients of the signature or message sequences is generated using a constant amplitude zero autocorrelation sequence generator 35. A method according to any of clauses 27 to 34, comprising supplying power to the signalling decoder, when the receiver is in a powered off or standby state when power is not supplied to some or all of the remaining parts of the receiver.

Various further aspects and features of the present disclosure are defined in the appended claims. Further example aspects and features of the present disclosure are defined in the appended claims. Various combinations of features may be made of the features and method steps defined in the dependent claims other than the specific combinations set out in the attached claim dependency. Thus the claim dependencies should not be taken as limiting.

The invention claimed is:

1. A transmitter for transmitting payload data using Orthogonal Frequency Division Multiplexed (OFDM) symbols, the transmitter comprising:
 a frame builder configured to
  receive the payload data to be transmitted,
  receive first signalling data for use in detecting and recovering the payload data at a receiver, and
  form the payload data with the first signalling data into frames for transmission;
 a modulator configured to
  modulate at least one first OFDM symbol with the first signalling data, and modulate one or more second OFDM symbols with the payload data;

a signature sequence processor configured to select a signature sequence from among plural signature sequences based on a message to be communicated to the receiver;

a combiner configured to combine the signature sequence with the at least one first OFDM symbol; and transmission circuitry configured to transmit the first and second OFDM symbols, wherein the combiner combines the signature sequence with the at least one first OFDM symbol so that the receiver can detect and recover the first signalling data from the at least one first OFDM symbol, and each of the plural signature sequences, when selected by the signature sequence processor and combined with the at least one first OFDM symbol, conveys a same message corresponding to the respective signature sequence to the receiver;

the corresponding messages of each of the plural signature sequences being different from each other, and the signature sequence processor selects the signature sequence based on presence or absence of emergency warning information to be transmitted to the receiver.

2. The transmitter of claim 1, wherein the at least one first OFDM symbol is of a first type having a different number of sub-carriers than the one or more second OFDM symbols of a second type.

3. The transmitter of claim 1, wherein each signature sequence comprises a set of coefficients that are combined with the at least one first OFDM symbol by adding each of the coefficients with a corresponding sample of the at least one first OFDM symbol.

4. The transmitter of claim 3, wherein the coefficients are based on a sequence generated using at least a first pseudo-random binary sequence generator configured to generate a first component of the coefficients, and at least a second pseudo-random binary sequence generator configured to generate a second component of the coefficients.

5. The transmitter of claim 3, wherein the set of coefficients of each signature sequence is generated using a constant amplitude zero autocorrelation sequence generator.

6. The transmitter of claim 1, wherein the message includes public broadcast information.

7. A method of transmitting payload data using Orthogonal Frequency Division Multiplexed (OFDM) symbols, the method comprising:

receiving the payload data to be transmitted;

receiving first signalling data for use in detecting and recovering at a receiver the payload data to be transmitted;

forming the payload data with the first signalling data into frames for transmission;

modulating at least one first OFDM symbol with the first signalling data;

modulating one or more second OFDM symbols with the payload data;

selecting a signature sequence from among plural signature sequences based on a message to be communicated to the receiver;

combining the signature sequence with the at least one first OFDM symbol; and transmitting the first and second OFDM symbols, wherein signature sequence is combined with the at least one first OFDM symbol so that the receiver can detect and recover the first signalling data from the at least one first OFDM symbol, and each of the plural signature sequences, when selected and combined with the at least one first OFDM symbol, conveys a same message corresponding to the respective signature sequence to the receiver; the corresponding messages of each of the plural signature sequences being different from each other, and the signature sequence is selected based on presence or absence of emergency warning information to be transmitted to the receiver.

8. The method of claim 7, wherein the at least one first OFDM symbol is of a first type having a different number of sub-carriers than the one or more second OFDM symbols of a second type.

9. The method of claim 7, wherein each signature sequence comprises a set of coefficients that are combined with the at least one first OFDM symbol by adding each of the coefficients with a corresponding sample of the at least one first OFDM symbol.

10. The method of claim 9, wherein the coefficients are based on a sequence generated using at least a first pseudo-random binary sequence generator configured to generate a first component of the coefficients, and at least a second pseudo-random binary sequence generator configured to generate a second component of the coefficients.

11. The method of claim 9, wherein the set of coefficients of each signature sequence is generated using a constant amplitude zero autocorrelation sequence generator.

12. The method of claim 7, wherein the message includes public broadcast information.

* * * * *